US012720135B2

(12) United States Patent
Mimura

(10) Patent No.: US 12,720,135 B2
(45) Date of Patent: Aug. 25, 2026

(54) CONTENT RECOMMENDATION METHOD, CONTENT DISTRIBUTION SYSTEM, RECOMMENDED CONTENT ESTIMATION APPARATUS, AND MACHINE LEARNING APPARATUS

(71) Applicant: SEIKO EPSON CORPORATION, Tokyo (JP)

(72) Inventor: Nona Mimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 22 days.

(21) Appl. No.: 18/621,493

(22) Filed: Mar. 29, 2024

(65) Prior Publication Data

US 2024/0333989 A1 Oct. 3, 2024

(30) Foreign Application Priority Data

Mar. 31, 2023 (JP) ................................ 2023-057597

(51) Int. Cl.
*H04N 21/25* (2011.01)
*H04N 21/239* (2011.01)
*H04N 21/422* (2011.01)

(52) U.S. Cl.
CPC ....... *H04N 21/251* (2013.01); *H04N 21/2393* (2013.01); *H04N 21/42202* (2013.01)

(58) Field of Classification Search
None
See application file for complete search history.

(56) References Cited

U.S. PATENT DOCUMENTS

2010/0188443 A1* 7/2010 Lewis .................. G09G 3/3413 345/691
2010/0287258 A1* 11/2010 Takeuchi ........... H04N 21/4131 709/217
2011/0149156 A1* 6/2011 Tokumo ............. H04N 21/8543 348/E7.017
2011/0292061 A1* 12/2011 Mineo ................. G06F 3/04897 345/581
2012/0072937 A1 3/2012 Ikeda et al.
2013/0007198 A1* 1/2013 Gupta .............. H04N 21/25866 709/217
2016/0112740 A1* 4/2016 Francisco ........ H04N 21/25883 725/12
2018/0167620 A1* 6/2018 Li ........................ H04N 19/593
(Continued)

FOREIGN PATENT DOCUMENTS

JP 2012-070036 A 4/2012
JP 2021-002230 A 1/2021

*Primary Examiner* — William J Kim
(74) *Attorney, Agent, or Firm* — Oliff PLC

(57) ABSTRACT

A processing device totalizes viewing logs for each of projectors and stores a totalization result in a storage device. The processing device performs clustering of a plurality of projectors based on environmental indicators, that is, illuminance, a screen size, and noise included in the totalization result. The processing device calculates, for each of a plurality of contents reproduced in the projectors belonging to groups formed by the clustering, evaluation values in the entire groups based on an evaluation value of each of the plurality of contents. The processing device determines, based on the evaluation value calculated for each of the groups, recommended contents for the projectors.

4 Claims, 13 Drawing Sheets

(56) References Cited

U.S. PATENT DOCUMENTS

| | | | | |
|---|---|---|---|---|
| 2018/0310051 | A1* | 10/2018 | Zabetian | H04N 21/41407 |
| 2019/0246112 | A1* | 8/2019 | Li | G06T 7/0002 |
| 2019/0342419 | A1* | 11/2019 | Bromand | H04W 4/02 |
| 2020/0213675 | A1* | 7/2020 | Mao | H04N 21/26258 |
| 2022/0046318 | A1* | 2/2022 | Sundar | G06F 12/0897 |

* cited by examiner

| CONTENT ID | X |
|---|---|
| TERMINAL ID | A |
| ILLUMINANCE (LUX) | 500 |
| SCREEN SIZE (INCH) | 150 |
| NOISE (DECIBEL) | 60 |
| EVALUATION VALUE (0.0 TO 5.0) | 5.0 |

| ILLUMINANCE (LUX) | 500 |
|---|---|
| SCREEN SIZE (INCH) | 150 |
| NOISE (DECIBEL) | 60 |

| CONTENT ID | NUMBER OF TIMES OF REPEATED REPRODUCTION | EVALUATION VALUE |
|---|---|---|
| X | 100 | 4.5 |
| Y | 5 | 2.0 |
| Z | 20 | 3.8 |

FIG. 12

8
MACHINE LEARNING APPARATUS
81
COMMUNICATOR
CONTROLLER
800
ACQUIRER
801
GENERATOR
80
82
TEACHER DATA STORAGE
TEACHER DATA
83
LEARNT MODEL STORAGE
LEARNING MODEL
9
2
CONTENT DISTRIBUTION SERVER
NET
4
PROJECTOR
4
PROJECTOR
4
PROJECTOR
4
PROJECTOR

FIG. 16

90
NEURAL NETWORK MODEL
INPUT LAYER
91
INTERMEDIATE LAYER
92
OUTPUT LAYER
93
EVALUATION VALUE
CORRECT ANSWER LABEL
TEACHER DATA
INPUT DATA
ENVIRONMENT INFORMATION
ATTRIBUTE INFORMATION
OUTPUT DATA
EVALUATION VALUE

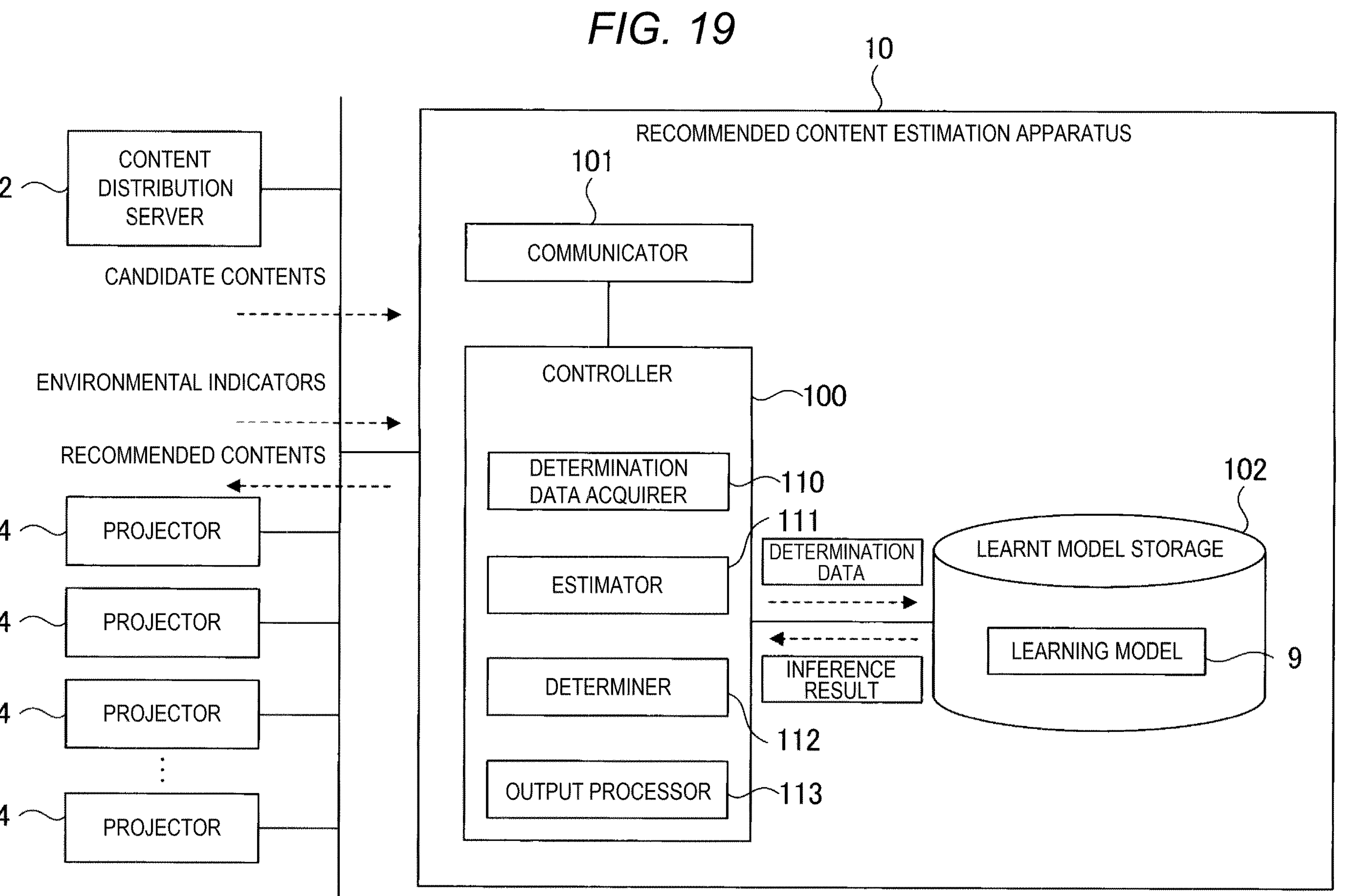
FIG. 19
10
RECOMMENDED CONTENT ESTIMATION APPARATUS
101
COMMUNICATOR
CONTROLLER
100
DETERMINATION DATA ACQUIRER
110
111
ESTIMATOR
DETERMINER
112
OUTPUT PROCESSOR
113
DETERMINATION DATA
INFERENCE RESULT
102
LEARNT MODEL STORAGE
LEARNING MODEL
9
2
CONTENT DISTRIBUTION SERVER
CANDIDATE CONTENTS
ENVIRONMENTAL INDICATORS
RECOMMENDED CONTENTS
4
PROJECTOR
4
PROJECTOR
4
PROJECTOR
4
PROJECTOR

CONTENT RECOMMENDATION METHOD, CONTENT DISTRIBUTION SYSTEM, RECOMMENDED CONTENT ESTIMATION APPARATUS, AND MACHINE LEARNING APPARATUS

The present application is based on, and claims priority from JP Application Serial Number 2023-057597, filed Mar. 31, 2023, the disclosure of which is hereby incorporated by reference herein in its entirety.

BACKGROUND

1. Technical Field

The present disclosure relates to a content recommendation method, a content distribution system, a recommended content estimation apparatus, and a machine learning apparatus.

2. Related Art

JP-A-2021-2230 (Patent Literature 1) discloses a technique for estimating, based on an estimation model, which is a neural network, for a content user to be an attribute estimation target, an attribute value such as age of the content user.

However, in the technique disclosed in Patent Literature 1, the attribute value for the content user is only estimated. Content optimum for the user cannot be recommended.

SUMMARY

According to an aspect of the present disclosure, there is provided a content recommendation method including: acquiring, for each of a plurality of viewing terminals, an environmental indicator indicating an environment in which a viewer views content; acquiring, for each of the plurality of viewing terminals, an evaluation value indicating a degree of viewing quality of the content, the evaluation value being given by the viewer; classifying the plurality of viewing terminals into a plurality of groups according to a similarity degree of two environmental indicators different from each other among a plurality of the acquired environmental indicators; and calculating an evaluation value in entire one group of the classified groups from a plurality of the evaluation values associated with the viewing terminals belonging to the classified one group and recommending, based on the calculated evaluation value, contents corresponding to the environment to viewers who use the viewing terminals belonging to the one group.

According to an aspect of the present disclosure, there is provided a content distribution system that distributes one or more contents to each of a plurality of viewing terminals, the content distribution system including: a content distribution server; and a data analysis server. The content distribution server distributes, out of a stored plurality of contents, viewing content corresponding to a request of a viewer, who uses each of the plurality of viewing terminals, to the viewing terminal associated with the viewer. The data analysis server includes: an acquirer configured to acquire, for each of the plurality of viewing terminals, an environmental indicator indicating an environment in which the viewer views content and an evaluation value indicating a degree of viewing quality of the content, the evaluation value being given by the viewer; a classifier configured to classify the plurality of viewing terminals into a plurality of groups according to a similarity degree of two environmental indicators different from each other among a plurality of the acquired environmental indicators; and a recommender configured to calculate an evaluation value in entire one group of the classified groups from a plurality of the evaluation values associated with the viewing terminals belonging to the classified one group and recommend, based on the calculated evaluation value, contents corresponding to the environment to viewers who use the viewing terminals belonging to the one group.

According to an aspect of the present disclosure, there is provided a recommended content estimation apparatus including: a determination data acquirer configured to acquire determination data including an environmental indicator indicating an environment in which a viewing terminal is installed and candidate content that is a candidate of content to be recommended to a first viewer who uses the viewing terminal; an estimator configured to estimate that an evaluation value output by inputting the determination data to a learning model that learned a relation between information concerning an environment at a time when a viewer views content and information concerning an attribute of the content and an evaluation value by the viewer for the content is an evaluation value of the first viewer for the candidate content; and a determiner configured to determine, based on the evaluation value estimated by the estimator, the content to be recommended to the first viewer.

According to an aspect of the present disclosure, there is provided a machine learning apparatus including: an acquirer configured to acquire a plurality of teacher data; and a generator configured to generate a learnt learning model by causing a learning model to machine-learn the plurality of teacher data. Each of the plurality of teacher data includes attribute information concerning an attribute of content viewed by a viewer using a viewing terminal and environment information indicating an environment of the viewing terminal and an evaluation value indicating a degree of viewing quality of the content, the evaluation value being given by the viewer.

BRIEF DESCRIPTION OF THE DRAWINGS

FIG. 12 is a flowchart showing an operation of recommended content determination by a processing device of the data analysis server.

FIG. 16 is a data configuration diagram showing an example of teacher data according to the second embodiment.

FIG. 19 is a block diagram showing an example of a recommended content estimation apparatus according to the second embodiment.

DESCRIPTION OF EMBODIMENTS

Figure 1:
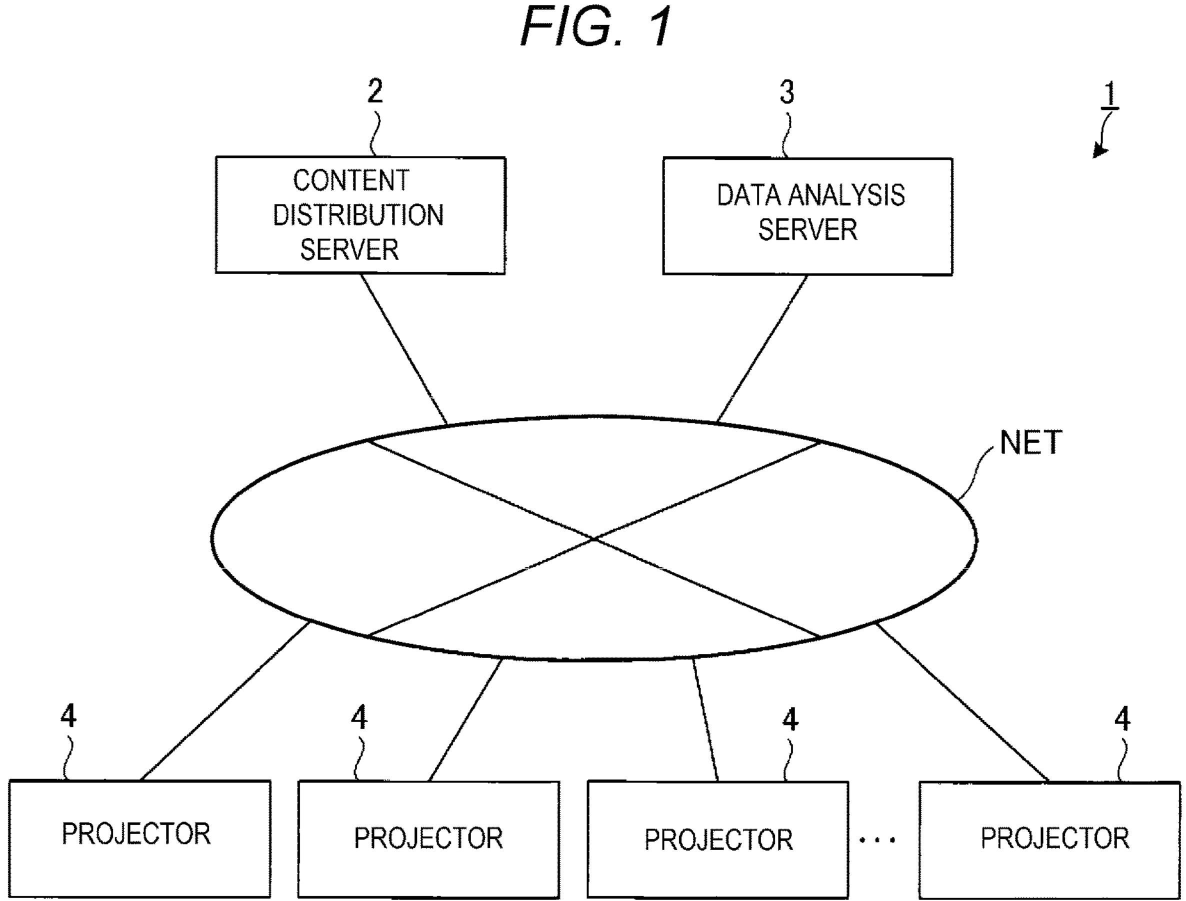
FIG. 1 is a configuration diagram of a content distribution system according to a first embodiment.

Preferred embodiments of the present disclosure are explained below with reference to the accompanying drawings. Note that, in the drawings, dimensions and scales of units are sometimes different from actual ones. Some portions are schematically shown in order to facilitate understanding. The scope of the present disclosure is not limited to the embodiments unless, in the following explanation, there is particularly description to the effect that the present disclosure is limited.

1. First Embodiment

1.1. Overview of a Content Distribution System

An overview of a content distribution system according to a first embodiment is explained below with reference to FIG. 1.

FIG. 1 is a configuration diagram of the content distribution system according to the first embodiment. A content distribution system 1 includes a content distribution server 2, a data analysis server 3, and a plurality of projectors 4 functioning as a plurality of viewing terminals.

The content distribution server 2, the data analysis server 3, and the plurality of projectors 4 are connected to one another via a network NET. The network NET is a network such as the Internet.

1.2. Configuration of the Content Distribution Server

A configuration of the content distribution server 2 according to the first embodiment is explained below with reference to FIG. 2.

Figure 2:
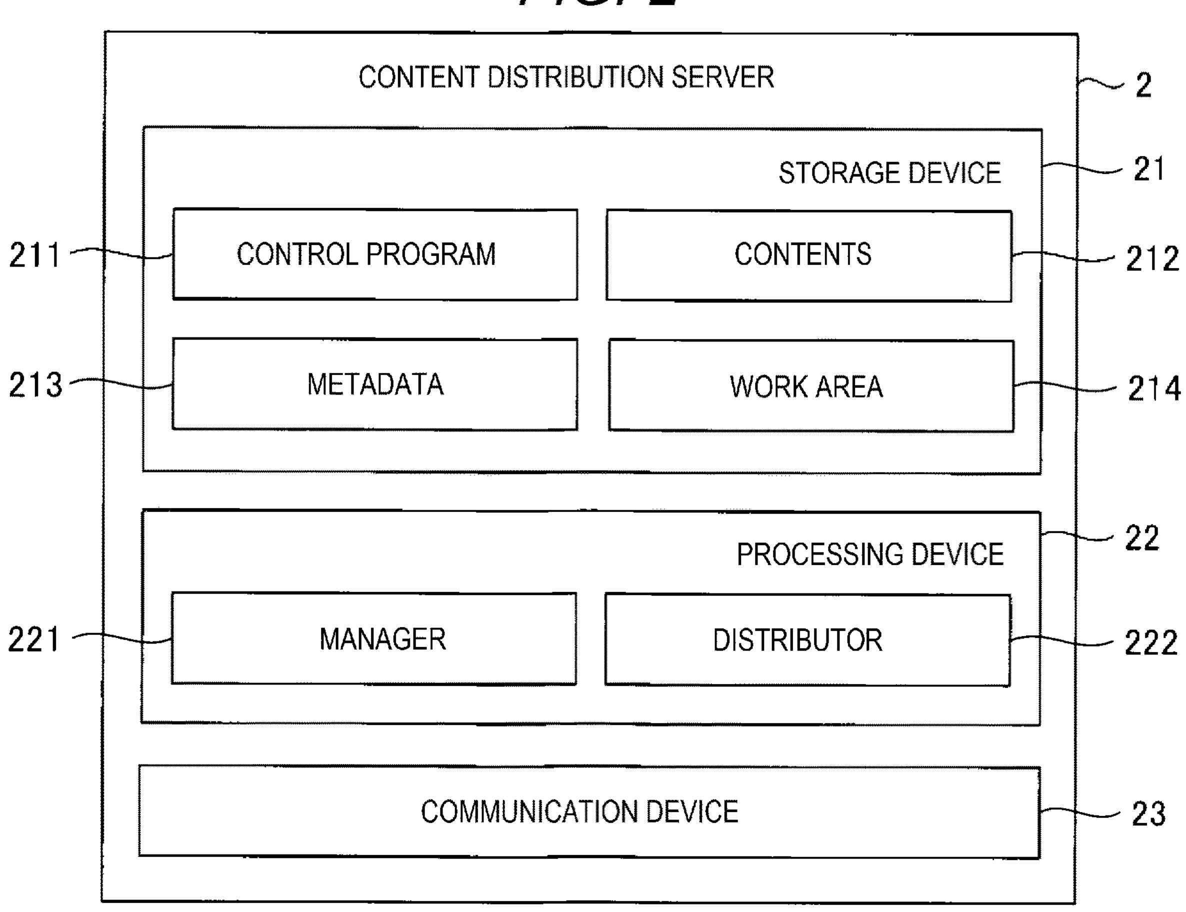
FIG. 2 is a block diagram showing a configuration example of the content distribution server shown in FIG. 1.

FIG. 2 is a block diagram showing a configuration example of the content distribution server 2 shown in FIG. 1. The content distribution server 2 includes a storage device 21, a processing device 22, and a communication device 23.

The storage device 21 stores various kinds of information. The storage device 21 includes, for example, a volatile memory such as a RAM and a nonvolatile memory such as a ROM. RAM is an abbreviation of Random Access Memory. ROM is an abbreviation of Read Only Memory. A control program 211, a plurality of contents 212, a plurality of metadata 213, and the like are stored in the storage device 21. The volatile memory of the storage device 21 is used for the processing device 22 as a work area 214 of the processing device 22. The control program 211 is a program for controlling the entire content distribution server 2.

Note that a part of or the entire storage device 21 may be provided in an external storage device, an external server, or the like. A part or all of the various kinds of information stored in the storage device 21 may be stored in the storage device 21 in advance or may be acquired from the external storage device, the external server, or the like.

The processing device 22 controls an operation of the content distribution server 2. The processing device 22 has functions of a manager 221 and a distributor 222. The processing device 22 includes one or more CPUs. However, the processing device 22 may include a programmable logic device such as an FPGA instead of or in addition to the CPUs. CPU is an abbreviation of Central Processing Unit. FPGA is an abbreviation of Field-Programmable Gate Array.

The processing device 22 reads out the control program 211 from the storage device 21 and executes the read-out control program 211. The processing device 22 executes the control program 211 to thereby function as the manager 221 and the distributor 222.

The manager 221 manages the plurality of contents 212 and the plurality of metadata 213 stored in the storage device 21. Each of the plurality of metadata 213 is associated with each of the plurality of contents 212 in a one to one relation. The content is mainly video content. The metadata include attribute information of the content corresponding to the metadata. The attribute information includes, for example, information indicating a title and an overview of the content, information indicating a genre of the content, and information indicating a contributor or a creator of the content.

The distributor 222 receives an acquisition request for content from the projector 4. When receiving an acquisition request for content selected by a viewer from the projector 4, the distributor 222 transmits the content to the projector 4 according to the received acquisition request. As the acquisition request for content, there are, for example, a streaming request or a download request for content.

The distributor 222 receives an acquisition request for recommendation information from the projector 4. When receiving the acquisition request for recommendation information, the distributor 222 transmits, according to the received acquisition request, recommendation information including recommended content separately determined in the data analysis server 3 to the projector 4. Note that the recommendation information may include information other than the recommended content. As the information other than the recommended content, the content distribution server 2 may select content similar to the recommended content.

The communication device 23 is hardware functioning as a transmission and reception device for performing communication with other devices. The communication device 23 is called, for example, network device, network controller, network card, and communication module as well. The communication device 23 includes a connector for wired connection and may include an interface circuit corresponding to the connector. The communication device 23 may include a wireless communication interface. Examples of the connector for wired connection and the interface circuit include products conforming to wired LAN, IEEE1394, USB, and the like. Examples of the wireless communication interface include products conforming to wireless LAN, Bluetooth (registered trademark), and the like. The communication device 23 performs data communication with the external devices such as the data analysis server 3 and the plurality of projectors 4.

As explained above, the content distribution server 2 functions as a server for a moving image distribution platform.

1.3. Configuration of the Data Analysis Server

A configuration of the date analysis server 3 according to the first embodiment is explained below with reference to FIG. 3.

Figure 3:
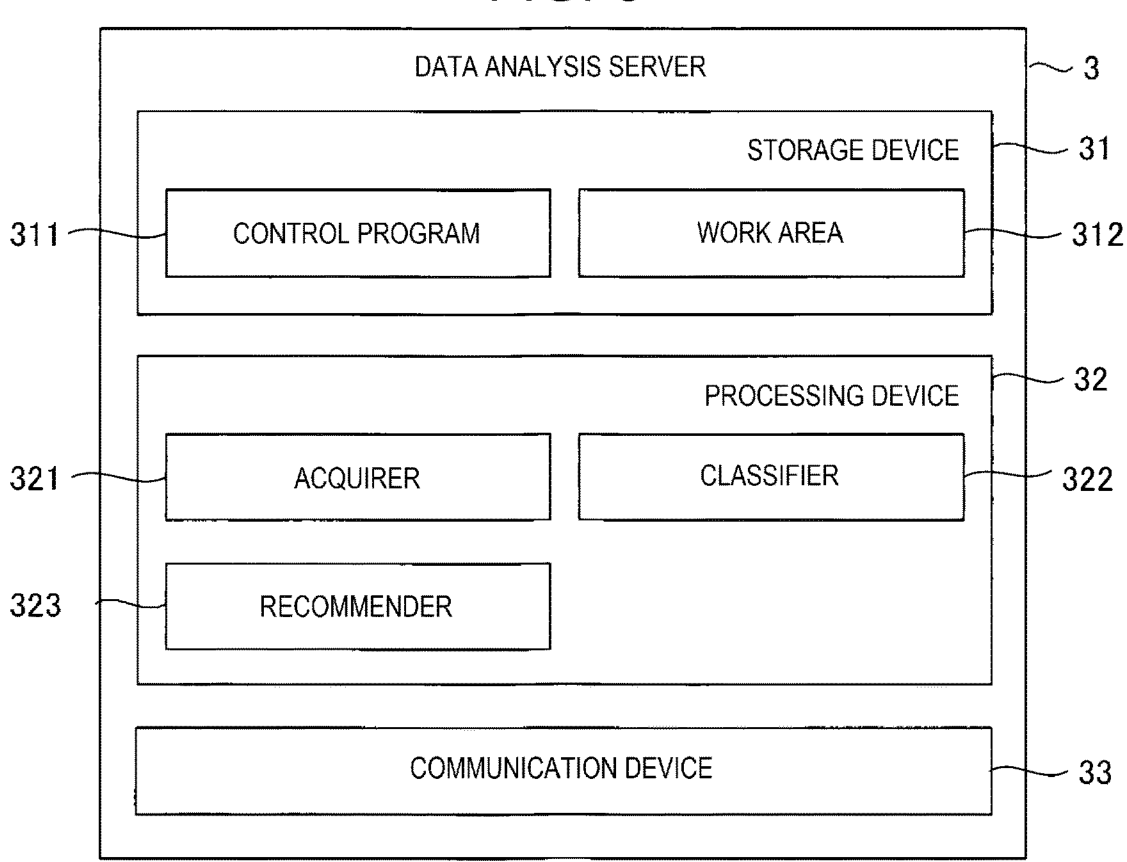
FIG. 3 is a block diagram showing a configuration example of a data analysis server shown in FIG. 1.

FIG. 3 is a block diagram showing a configuration example of the data analysis server 3 shown in FIG. 1. The data analysis server 3 includes a storage device 31, a processing device 32, and a communication device 33.

The storage device 31 stores various kinds of information. The storage device 31 includes, for example, a volatile memory such as a RAM and a nonvolatile memory such as a ROM. A control program 311 and the like are stored in the storage device 31. The volatile memory of the storage device 31 is used for the processing device 32 as a work area 312 of the processing device 32. The control program 311 is a program for controlling the entire data analysis server 3.

Note that a part of or the entire storage device 31 may be provided in an external storage device, an external server, or the like. A part or all of the various kinds of information stored in the storage device 31 may be stored in the storage device 31 in advance or may be acquired from the external storage device, the external server, or the like.

The processing device 32 controls an operation of the data analysis server 3. The processing device 32 has functions of an acquirer 321, a classifier 322, and a recommender 323. The processing device 32 includes one or more CPUs. However, the processing device 32 may include a programmable logic device such as an FPGA instead of or in addition to the CPUs.

The acquirer 321 acquires environmental indicators and an evaluation value for each of the plurality of projectors 4. The environmental indicators are indicators indicating an environment in which the viewer views content, that is, a viewing environment. For example, the environmental indicators are brightness of places where the projectors 4 are installed, screen sizes of projection images projected by the projectors 4, noise in the places where the projectors 4 are installed, and various setting values set in the projectors 4. The various setting values are a color mode, set sound volume, and the like.

The brightness, which is one of the environmental indicators, greatly affects viewing of the projector 4. For example, in a bright room into which external light shines from a window, since a contrast ratio of a projection image decreases, the room is unsuitable for reproduction of content such as a movie including a lot of dark scenes. In public places such as commercial facilities and restaurants, a tendency of content viewed in a relatively bright environment and a tendency of content viewed in a relatively dark environment are considered to be different. Therefore, it is considered meaningful to use the brightness as one of the environmental indicators.

In a relatively large screen size exceeding 100 inches, for example, content such as a movie or sports live broadcast is considered to be often preferably viewed. A tendency of content viewed in a relatively large screen size and a tendency of content viewed on a relatively small screen size are considered to be different. Content including a lot of fine characters and the like is not considered to be suitable for an environment in which a screen size is small. In this way, it is considered meaningful to use the screen size as one of the environmental indicators.

When a viewing environment in a home and a viewing environment in a commercial facility are compared, it is considered that there is a tendency that a noise value is higher in the viewing environment in the commercial facility. Since a tendency of content viewed in the home and a tendency of content viewed in the commercial facility are different, it is considered meaningful to use the noise as one of the environmental indicators.

In this embodiment, a method of determining, based on three environmental indicators including brightness, a screen size, and noise, content to be recommended is explained.

The evaluation value is a value indicating a degree of viewing quality of content evaluated by the viewer. The evaluation value is given to the content by the viewer. For example, the evaluation value is converted into a numerical value by the viewer in fifty-one stages of 0.0 to 5.0. The viewer of the content inputs the evaluation value to the projector 4 during or after appreciation.

The classifier 322 classifies the plurality of projectors 4 into a plurality of groups according to a similarity degree of two environmental indicators different from each other among an acquired plurality of environmental indicators. More specifically, the classifier 322 classifies the plurality of projectors 4 into a plurality of groups using a clustering method, which is a type of unsupervised learning. The plurality of projectors 4 included in the groups have viewing environments similar to one another. Note that the groups classified by the clustering method are called clusters as well. The classification by the clustering method is explained in detail below.

The recommender 323 calculates, from evaluation values associated with the viewing terminals belonging to classified one group, an evaluation value in the entire one group. The recommender 323 recommends, based on the calculated evaluation value, content corresponding to the viewing environments to viewers who use the projectors 4 belonging to the one group.

The communication device 33 is hardware functioning as a transmission and reception device for performing communication with other devices. The communication device 33 is called, for example, network device, network controller, network card, and communication module as well. The communication device 33 includes a connector for wired connection and may include an interface circuit corresponding to the connector. The communication device 33 may include a wireless communication interface. Examples of the connector for wired connection and the interface circuit include products conforming to wired LAN, IEEE1394, USB, and the like. Examples of the wireless communication interface include products conforming to wireless LAN, Bluetooth, and the like. The communication device 33 performs data communication with external devices such as the content distribution server 2 and the plurality of projectors 4.

1.4. Viewing Environment

A viewing environment according to the first embodiment is explained below with reference to FIG. 4.

Figure 4:
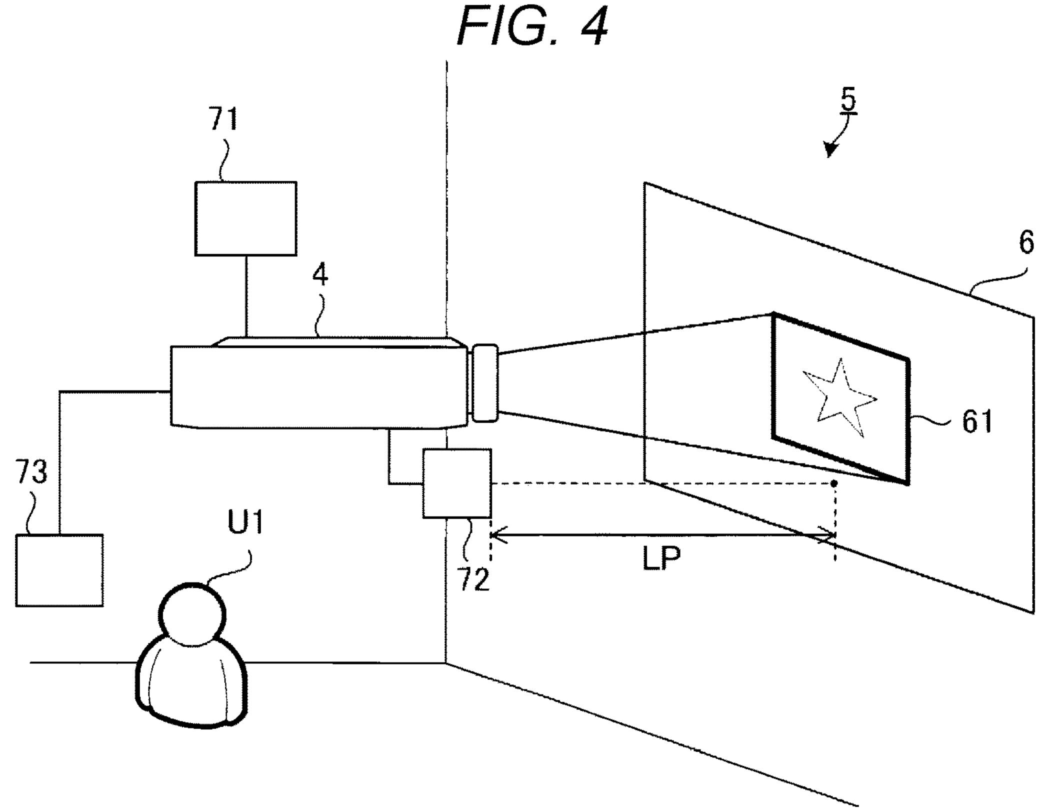
FIG. 4 is a schematic diagram showing an example of a viewing environment in which projectors shown in FIG. 1 are installed.

FIG. 4 is a schematic diagram showing an example of a viewing environment in which the projectors 4 shown in FIG. 1 are installed. The projector 4 and a screen 6 are installed in a viewing environment 5. Output light from the projector 4 is projected onto the screen 6. An image projected on the screen 6 is hereinafter referred to as projection image 61. A viewer U1 appreciates the projection image 61. Note that a surface onto which the projection image 61 is projected is not limited to the screen 6 and may be a wall surface, a ceiling, or the like of a building.

An illuminance sensor 71, a distance sensor 72, and a noise sensor 73 are connected to the projector 4.

The illuminance sensor 71 detects the illuminance in the viewing environment 5, that is, the brightness of the viewing environment 5. The distance sensor 72 is installed in a reference position of the projector 4.

The distance sensor 72 measures a distance LP between the projector 4 and the screen 6. The distance LP is a value necessary to calculate a screen size. For example, a laser distance meter is used as the distance sensor 72. Note that a millimeter wave radar, an LiDAR scanner, or the like may be used as the distance sensor 72. LiDAR is an abbreviation of Light Detection And Ranging.

The noise sensor 73 detects noise in the viewing environment 5. For example, a noise meter is used as the noise sensor 73. The noise sensor 73 is preferably installed in a position where the influence of noise caused by a fan of the projector 4 can be neglected. Note that a smartphone incorporating an application of the noise meter may be used as the noise sensor 73 instead of the noise meter.

1.5. Configuration of the Projector

A configuration of the projector 4 according to the first embodiment is explained below with reference to FIG. 5.

Figures 5, 6:
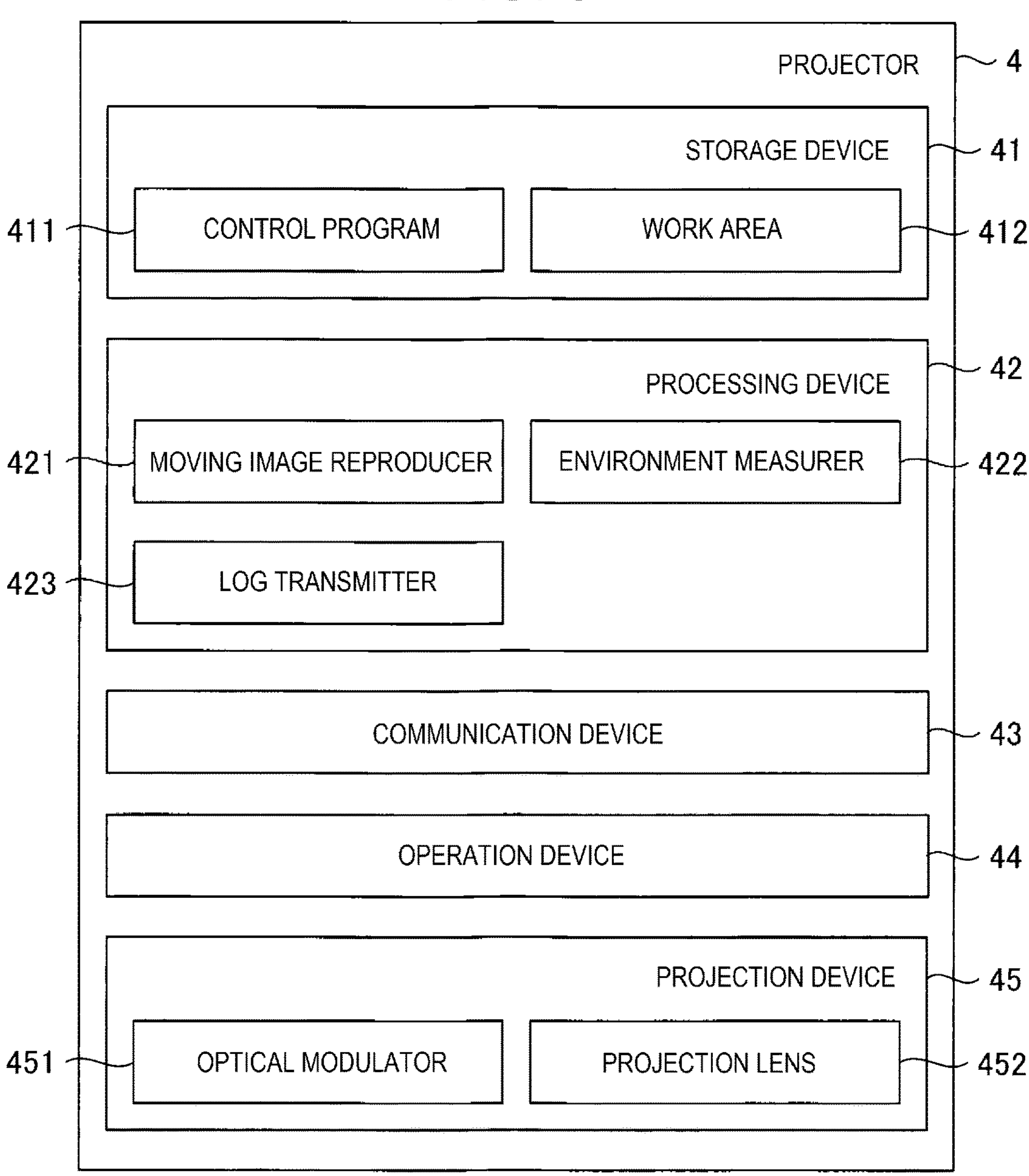
FIG. 5 is a block diagram showing a configuration example of the projectors shown in FIG. 1.
FIG. 6 is a diagram showing an example of viewing data received in the data analysis server.

FIG. 5 is a block diagram showing a configuration example of the projectors 4 shown in FIG. 1. The projector 4 includes a storage device 41, a processing device 42, a communication device 43, an operation device 44, and a projection device 45. The storage device 41 stores various kinds of information. The storage device 41 includes, for example, a volatile memory such as a RAM and a nonvolatile memory such as a ROM. A control program 411 and the like are stored in the storage device 41. The volatile memory of the storage device 41 is used for the processing device 42 as a work area 412 of the processing device 42. The control program 411 is a program for controlling the entire projector 4.

Note that a part of or the entire storage device 41 may be provided in an external storage device, an external server, or the like. A part or all of the various kinds of information stored in the storage device 41 may be stored in the storage device 41 in advance or may be acquired from the external storage device, the external server, or the like.

The processing device 42 controls an operation of the projector 4. The processing device 42 has functions of a moving image reproducer 421, an environment measurer 422, and a log transmitter 423. The processing device 42 includes one or more CPUs. However, the processing device 42 may include a programmable logic device such as an FPGA instead of or in addition to the CPUs.

The processing device 42 reads out the control program 411 from the storage device 41 and executes the read-out control program 411. The processing device 42 executes the control program 411 to thereby function as the moving image reproducer 421, the environment measurer 422, and the log transmitter 423.

The moving image reproducer 421 reproduces a moving image acquired from the content distribution server 2.

The environment measurer 422 measures environmental indicators in a viewing environment. In this embodiment, the environment measurer 422 measures three environmental indicators including illuminance, a screen size, and noise. The environment measurer 422 acquires information concerning the illuminance in the viewing environment from the illuminance sensor 71. The environment measurer 422 acquires information concerning the distance LP from the distance sensor 72 and calculates a screen size based on the acquired information concerning the distance LP and a predetermined projection light spread angle. The environment measurer 422 acquires information concerning a noise value from the noise sensor 73.

The log transmitter 423 transmits a viewing log to the content distribution server 2 via the communication device 43. The viewing log is a history of information concerning content reproduced by the projector 4. The viewing log includes, for one content, for example, a viewing date and time, operation of the viewer during reproduction, an evaluation value by the viewer.

The communication device 43 is hardware functioning as a transmission and reception device for performing communication with other devices. The communication device 43 is called, for example, network device, network controller, network card, or communication module as well. The communication device 43 includes a connector for wired connection and may include an interface circuit corresponding to the connector. The communication device 43 may include a wireless communication interface. Examples of the connector for wired connection and the interface circuit include products conforming to wired LAN, IEEE1394, USB, and the like. Examples of the wireless communication interface include products conforming to wireless LAN and Bluetooth. The communication device 43 performs data communication with external devices such as the content distribution server 2 and the data analysis server 3.

The operation device 44 is an input interface that receives input operation on the projector 4 from a user. The operation device 44 includes operation buttons provided on a housing of the projector 4. The operation device 44 outputs information for identifying a pressed operation button to the processing device 42. Consequently, content of input operation of the user to the operation device 44 is output to the processing device 42. The content of the input operation of the user to the operation device 44 is transmitted to the processing device 42.

Therefore, the viewer can input an evaluation value of content to the projector 4 via the operation device 44. Note that the operation device 44 may include a touch panel instead of the operation buttons. In this case, the operation device 44 outputs data indicating a detected touch position to the processing device 42. The operation device 44 may be a remote controller device independent of the housing of the projector 4.

The projection device 45 projects projection light. The projection device 45 includes a not-shown light source, an optical modulator 451, and a projection lens 452. The light source includes a halogen lamp, a Xenon lamp, an ultrahigh pressure mercury lamp, an LED, and a laser light source. The optical modulator 451 includes one or more liquid crystal panels. Note that the optical modulator 451 may include a DMD instead of the liquid crystal panel.

The optical modulator 451 modulates, based on a signal input from the processing device 42, light emitted from the light source into projection light for displaying the projection image 61 on the screen 6. LED is an abbreviation of Light Emitting Diode. DMD is an abbreviation of Digital Mirror Device. The projection lens 452 forms, on the screen 6, an image of the projection light modulated by the optical modulator 451.

The projection device 45 projects, according to control of the moving image reproducer 421, projection light for displaying the projection image 61 on the screen 6. In other words, the projection device 45 projects an image based on image information input from the processing device 42 onto the screen 6.

1.6. Acquisition Method for Environmental Indicators and a Viewing Log

An acquisition method for environmental indicators and a viewing log is explained below with reference to FIGS. 6 to 8.

FIG. 6 is a diagram showing an example of viewing data received in the data analysis server 3. The data analysis server 3 receives viewing data shown in FIG. 6 every time reproduction of content is performed in the projectors 4.

FIG. 6 indicates that a content ID of content reproduced in the projector 4 is "X" and a terminal ID of the projector 4 is "A". According to the example shown in FIG. 6, the illuminance in the viewing environment 5 is 500 lux, a screen size is 150 inches, and noise is 60 decibels.

The processing device 42 of the projector 4 acquires environmental indicators for an environment in which the projector 4 is installed.

Figures 7, 8, 9:
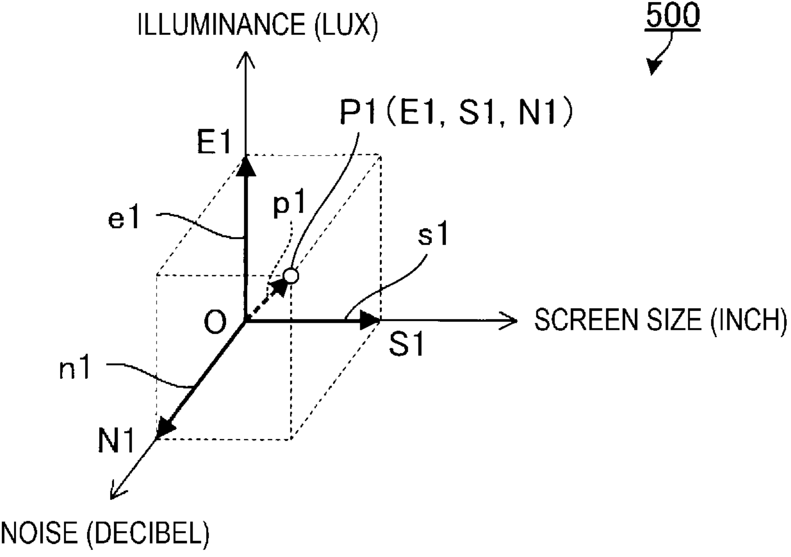
FIG. 7 is a diagram showing an example of environmental indicators acquired in an acquirer.
FIG. 8 is a diagram showing an example of a viewing log for a certain projector.
FIG. 9 is a diagram showing a three-dimensional feature vector space in which three environmental indicators including illuminance, a screen size, and noise are respectively feature vectors.

FIG. 7 is a diagram showing an example of environmental indicators acquired in the acquirer 321. The acquirer 321 extracts information concerning illuminance, information concerning a screen size, and information concerning noise from the viewing data shown in FIG. 6 and obtains the environmental indicators shown in FIG. 7. The acquired environmental indicators are used for clustering.

FIG. 8 is a diagram showing an example of a viewing log for a certain projector 4. In this example, in the viewing log, the number of times of repeated reproduction and an evaluation value for content are recorded for each of contents "X", "Y", and "Z" reproduced in the projector 4 having a terminal ID "A". Here, the number of times of repeated reproduction represents the number of times of reproduction of the same content in one projector 4. The evaluation values are average values obtained by dividing evaluation values for each reproduction by the number of times of reproduction. The acquirer 321 creates, based on a received plurality of viewing data, the viewing log shown in FIG. 8 for each of viewing terminals.

1.7. Determination Operation for Recommended Content

A determination operation for recommended content in the data analysis server 3 is explained with reference to FIGS. 9 to 12.

FIG. 9 is a diagram showing a three-dimensional feature vector space in which three environmental indicators including illuminance, a screen size, and noise are respectively feature vectors. In a three-dimensional feature vector space 500, an illuminance vector e1, which is a feature vector for the illuminance, a screen size vector s1, which is a feature vector for the screen size, and a noise vector n1, which is a feature vector for the noise, are orthogonal to one another. This is because the illuminance, the screen size, and the noise are physical quantities independent of one another.

A coordinate of a tip position P1 of a combined vector p1 obtained by combining the three feature vectors is (E1, S1, N1). The combined vector p1 is a position vector of a point P1 with respect to an origin O.

Figure 10:
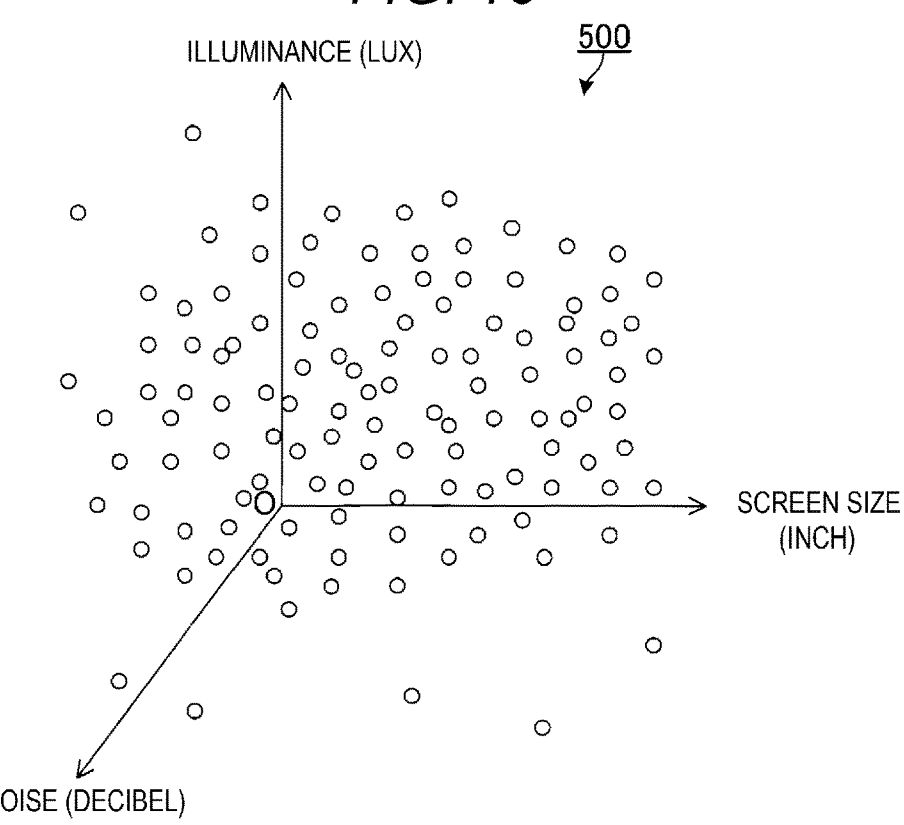
FIG. 10 is a diagram showing a distribution of combined vectors of environmental indicators in each of an acquired plurality of viewing environments.

FIG. 10 is a diagram showing a distribution of combined vector of environmental indicators in each of an acquired plurality of viewing environments. Each of a plurality of white circles shown in FIG. 10 represents a tip position of a combined vector of an acquired environmental indicator. The classifier 322 classifies tip positions of the combined vectors of the environmental indicators scattered in the feature vector space 500 into a plurality of groups according to similarity degrees among the tip positions.

More specifically, the classifier 322 classifies the tip positions of the combined vectors of the environmental indicators scattered in the feature vector space 500 into a plurality of groups using the clustering method. The similarity degree is calculated from a Euclidian distance between two environmental indicators different from each other among the plurality of environmental indicators, that is, tip positions of two combined vectors different from each other.

Figure 11:
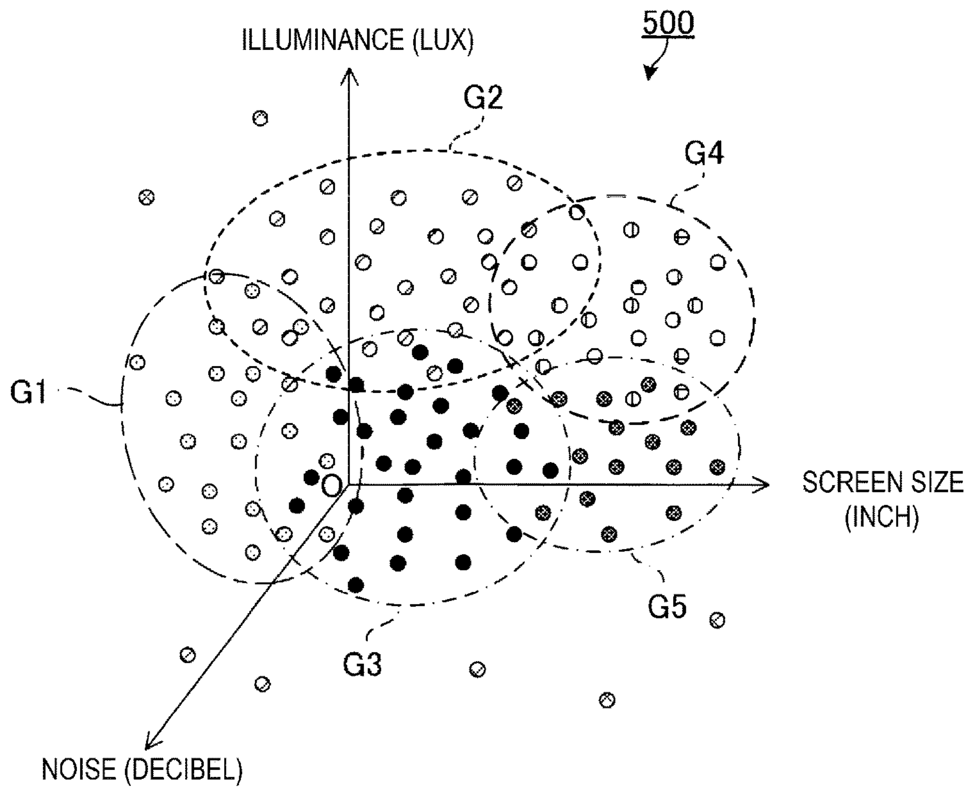
FIG. 11 is a diagram showing a result of classifying the environmental indicators into a plurality of groups.

FIG. 11 is a diagram showing a result of classifying the environmental indicators into a plurality of groups. In an example shown in FIG. 11, the plurality of environmental indicators are classified into five groups G1 to G5 according to similarity degrees.

For contents reproduced in the projectors 4 belonging to the classified first group G1, the recommender 323 calculates an evaluation value in the entire first group G1 from evaluation values of the contents in the projectors 4. An evaluation value of certain content in the entire first group G1 is obtained as, for example, a value obtained by dividing a sum of evaluation values of content for each production in each of the plurality of projectors 4 belonging to the first group G1 by a total number of times of reproduction of the content. Note that evaluation values may be given to one content from a plurality of viewers.

The recommender 323 calculates evaluation values in the entire first group G1 for all of contents reproduced by the projectors 4 belonging to the first group G1. The recommender 323 determines, as recommended content, content ranked high in the evaluation values in the entire first group G1. The recommender 323 provides recommendation information, which is information concerning the determined recommended content, to the content distribution server 2.

Note that evaluation values of certain content in the entire groups may be weighted by the numbers of times of repeated reproduction. For example, the recommender 323 performs the weighting by multiplying an evaluation value of content for each reproduction by a coefficient larger than 1 corresponding to the number of times of repeated reproduction. The recommender 323 may exclude contents reproduced in the projectors 4 from the recommended contents for the projectors 4.

Similarly, in the classified second, third, fourth, and fifth groups G2, G3, G4, and G5, the recommender 323 respectively calculates evaluation values in entire groups of a plurality of contents. The recommender 323 determines recommended content based on the calculated evaluation values of the contents and provides recommendation information to the content distribution server 2.

When receiving the recommendation information, the manager 221 of the content distribution server 2 provides recommended content information to the projectors 4. In this way, the recommender 323 recommends, via the content distribution server 2, contents corresponding to viewing environments to one or a plurality of viewers who use the projectors 4. Note that one viewer may own a plurality of projectors 4. The one or the plurality of viewers to whom the contents are recommended from the recommender 323 may be different from or may be the same as one or a plurality of viewers who gave evaluation values to one content in the past. When the one or the plurality of viewers to who the contents are recommended from the recommender 323 are different from the one or the plurality of viewers who gave evaluation values to one content in the past, the former may be referred to as one or a plurality of viewers and the latter may be referred to as one or a plurality of other viewers.

Figure 12:
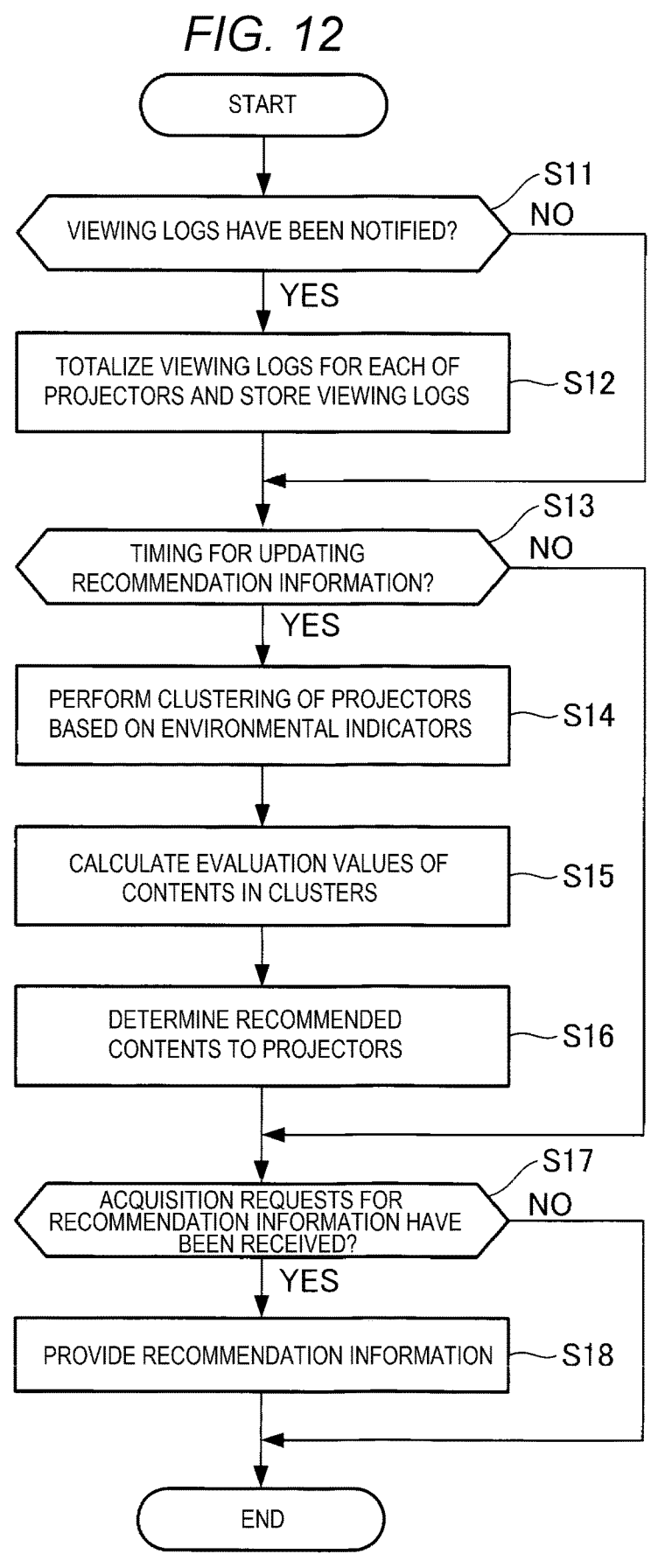

FIG. 12 is a flowchart showing an operation of recommended content determination by the processing device 32 of the data analysis server 3. The operation of the processing device 32 is explained below with reference to FIG. 12. A routine shown in FIG. 12 is started by, for example, the processing device 32 being started and is executed every time a fixed time elapses.

When the routine shown in FIG. 12 is started, first, in step S11, the processing device 32 determines whether viewing logs have been notified from the projectors 4.

When the processing device 32 determines in step S11 that viewing logs have been notified, that is, when a determination result in step S11 is affirmative (YES in step S11), the processing device 32 executes processing in step S12. In this case, in step S12, the processing device 32 totalizes the viewing logs for each of the projectors 4 and stores a totalization result in the storage device 31. The totalization result includes environmental indicators, that is, illuminance, a screen size, and noise of each of the projectors 4.

On the other hand, when the processing device 32 determines in step S11 that viewing logs have not been notified, that is, when the determination result in step S11 is negative (NO in step S11), the processing device 32 skips the processing in step S12 and executes processing in step S13. That is, in this case, the processing device 32 does not execute the totalization and the storage of viewing logs.

Subsequently, in step S13, the processing device 32 determines whether it is timing for updating recommendation information. The timing for updating the recommendation information may be determined according to a predetermined update period or may be determined according to a request for update from the content distribution server 2.

When the processing device 32 determines in step S13 that it is the timing for updating the recommendation information, that is, when a determination result in step S13 is affirmative (YES in step S13), the processing device 32 executes processing in step S14. In this case, in step S14, the processing device 32 performs clustering of the plurality of projectors 4 based on environmental indicators, that is, illuminance, screen sizes, and noise included in the totalization result.

Subsequently, in step S15, for each of a plurality of contents reproduced in the projectors 4 belonging to groups formed by the clustering, the processing device 32 calculates evaluation values in the entire groups based on evaluation values of each of the plurality of contents.

Subsequently, in step S16, the processing device 32 determines recommended content to the projectors 4 based on the evaluation values calculated for each of the groups.

Subsequently, in step S17, the processing device 32 determines whether acquisition requests for recommendation information have been received from the viewing terminals. Timing for the acquisition request for the recommendation information is, for example, timing when the viewer retrieves content in a moving image distribution platform or timing when the viewer accesses a home screen of the moving image distribution platform. In this example, the acquisition request for the recommendation information is transmitted from the content distribution server 2.

When the processing device 32 determines in step S17 that an acquisition request for recommendation information has been received, that is, when a determination result in step S17 is affirmative (YES in step S17), the processing device 32 executes processing in step S18. In this case, in step S18, the processing device 32 provides the recommendation information to the content distribution server 2 and once ends this routine.

On the other hand, when the processing device 32 determines that an acquisition request for recommendation information has not been received, that is, when the determination result in step S17 is negative (NO in step S17), the processing device 32 skips the processing in step S18 and once ends this routine. That is, in this case, recommendation information is not provided.

The operation of the processing device 32 relating to the selection operation is as explained above. Note that the processing device 32 functions as explained below in the steps explained above. The processing device 32 functions as the acquirer 321 in step S11. The processing device 32 functions as the classifier 322 in steps S12 to S16. The processing device 32 functions as the recommender 323 in step S17.

1.8. Effects Achieved by the First Embodiment

As explained above, in the content recommendation method, the environmental indicators are acquired for each of the plurality of projectors 4. The environmental indicators are indicators indicating an environment in which the viewer views content, that is, a viewing environment. In this method, the evaluation values given by the viewer are acquired for each of the plurality of projectors 4. The evaluation values are values indicating degrees of viewing quality of the content. In this method, the plurality of projectors 4 are classified into the plurality of groups G1 to G5 according to a similarity degree of two environmental indicators different from each other among the acquired plurality of environmental indicators. In this method, from evaluation values associated with the projectors 4 belonging to classified one group, an evaluation value in the entire one group is calculated. Further, in this method, contents corresponding to viewing environments are recommended to viewers who use the projectors 4 belonging to one group based on the calculated evaluation value.

With the content recommendation method explained above, it is possible to learn, using the unsupervised learning, a viewing environment of a viewer who uses the moving image distribution platform. With the content recommendation method explained above, it is possible to classify the plurality of projectors 4 into several groups for each of viewing environments and calculate evaluation values of contents associated with the projectors 4 belonging to classified one group. Contents ranked high in the calculated evaluation value among a plurality of contents reproduced by the plurality of projectors 4 belonging to one group are considered to be contents suitable for viewing environments of the projectors 4 belonging to the group, that is, contents that should be recommended. Therefore, with the content recommendation method explained above, it is possible to recommend content suitable for a viewing environment to the viewer.

Note that, in the first embodiment, the projector 4 is an example of the "viewing terminal" and the screen 6 is an example of the "projection target".

The environmental indicators include the illuminance of a viewing environment, a size of the screen 6 of the projector 4, and noise in the viewing environment.

The illuminance indicating the brightness of the viewing environment is an indicator greatly affecting viewing of the projector 4. A tendency of content viewed in a relatively bright environment and a tendency of content viewed in a relatively dark environment are considered to be different. A tendency of content viewed in a relatively large screen size and a tendency of content viewed on a relatively small screen size are considered to be different. A tendency of content viewed in a home where a noise value is relatively low and a tendency of content viewed in a commercial facility where a noise value is relatively high are considered to be different.

Therefore, by learning the viewing environment of the viewer using the illuminance of the viewing environment, the size of the screen 6 of the projector 4, and the noise in the viewing environment as the environmental indicators, it is possible to recommend more appropriate content to the viewer.

As explained above, the viewing terminal is the projector 4, the content is displayed on the screen 6 by the projector 4, and the size of the screen is the size of the screen displayed on the screen 6.

A projector is a display device easily affected by illuminance. Since the luminance on a projection surface decreases as a size of a screen is increased, the projector is more easily affected by the illuminance as the size of the screen is increased. The projector is widely used in an environment in which a noise value is relatively low to an environment in which a noise value is relatively high. Therefore, with the content recommendation method explained above, since a plurality of projectors are classified into several groups using the illuminance, the size of the screen, and the noise as indicators, it is possible to recommend contents suitable for use environments of the projectors.

The environmental indicators include at least noise.

With the content distribution system 1, since the viewing terminals are classified into several groups using the noise as an indicator, it is possible to recommend contents suitable for use environments of the viewing terminals.

The content distribution system 1 is a system that distributes one or more contents to each of the plurality of projectors 4. The content distribution system 1 includes the content distribution server 2 and the data analysis server 3. The content distribution server 2 distributes, out of a stored plurality of contents, viewing content corresponding to a request of a viewer, who uses each of the plurality of projectors 4, to the projector 4 associated with the viewer.

The data analysis server 3 includes the acquirer 321, the classifier 322, and the recommender 323. The acquirer 321 acquires environmental indicators and an evaluation value for each of the plurality of projectors 4. The environmental indicators are indicators indicating an environment in which a viewer views content, that is, a viewing environment. The evaluation value is a value indicating a degree of viewing quality of the content given by the viewer. The classifier 322 classifies the plurality of projectors 4 into a plurality of groups according to a similarity degree of two environmental indicators different from each other among an acquired plurality of environmental indicators. The recommender 323 calculates, from evaluation values associated with viewing terminals belonging to classified one group, an evaluation value in the entire one group. The recommender 323 recommends, based on the calculated evaluation value, contents corresponding to viewing environments to viewers who use the projectors 4 belonging to the one group.

With the content distribution system explained above, it is possible to learn, using the unsupervised learning, a viewing environment of a viewer who uses the moving image distribution platform. With the content distribution system explained above, it is possible to classify the plurality of projectors 4 into several groups for each of viewing environments and calculate evaluation values of contents associated with the projectors 4 belonging to classified one group. Contents ranked high in the calculated evaluation values among a plurality of contents reproduced by the plurality of projectors 4 belonging to one group are considered to be contents suitable for viewing environments of the projectors 4 belonging to the group, that is, contents that should be recommended. Therefore, with the content recommendation system explained above, it is possible to recommend content suitable for a viewing environment to the viewer.

2. Second Embodiment

A content distribution system, a machine learning apparatus, and a recommended content estimation apparatus according to a second embodiment of the present disclosure are explained below with reference to FIGS. 13 to 19. Note that, in the following explanation, for simplification of explanation, the same components as the components in the first embodiment are denoted by the same reference numerals and signs and explanation of the functions of the components is sometimes omitted. In the following explanation, for simplification of explanation, differences of the second embodiment from the first embodiment are mainly explained.

2.1. Configuration of the Second Embodiment

A configuration of the content distribution system according to the second embodiment is explained below with reference to FIGS. 13 and 14.

Figure 13:
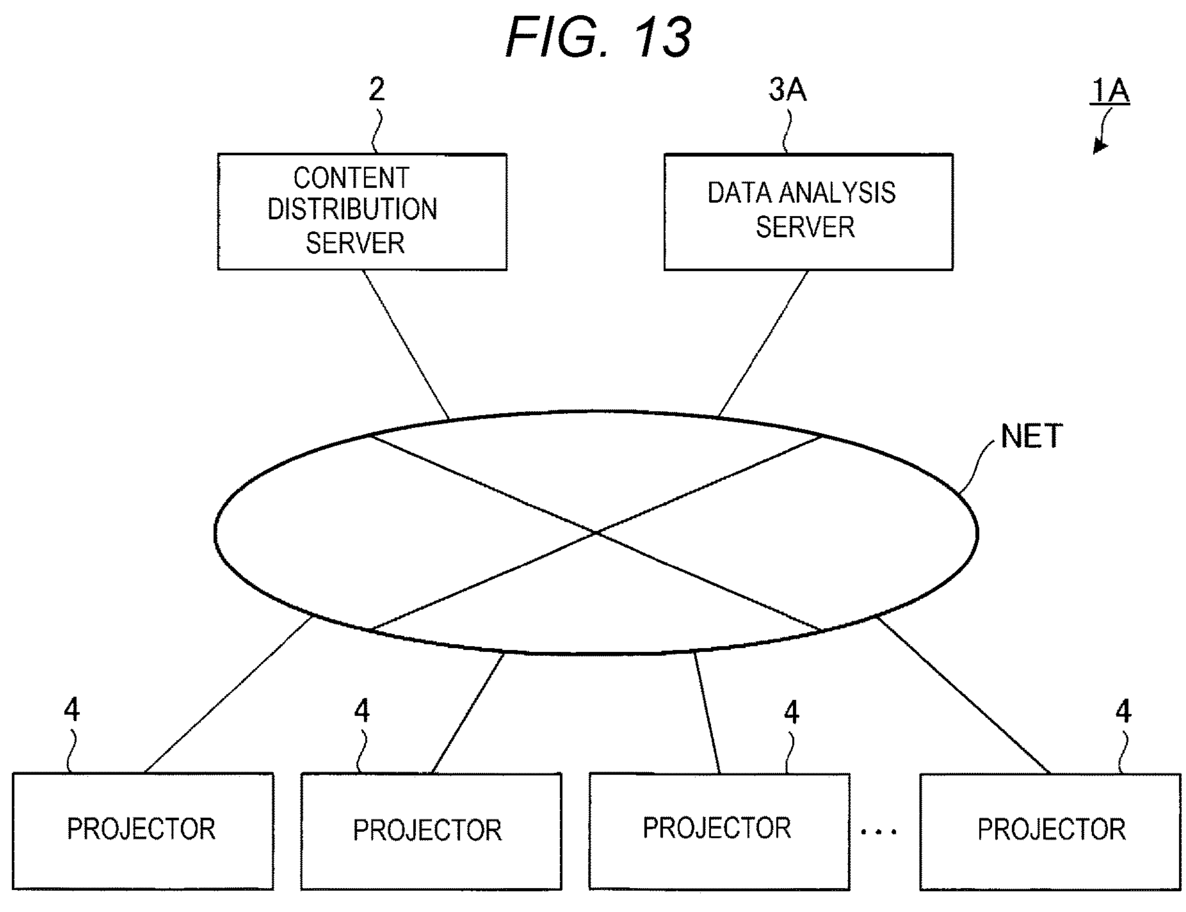
FIG. 13 is a configuration diagram of a content distribution system according to a second embodiment.

FIG. 13 is a configuration diagram of the content distribution system according to the second embodiment. A content distribution system 1A includes the content distribution server 2, a data analysis server 3A, and the plurality of projectors 4 functioning as a plurality of viewing terminals.

The content distribution server 2, the data analysis server 3A, and the plurality of projectors 4 are connected to one another via the network NET.

The data analysis server 3 according to the first embodiment functions as the server that executes the unsupervised learning. However, the data analysis server 3A according to the second embodiment functions as a server that executes supervised learning or a server that recommends content using a result of the supervised learning. In this regard, a configuration of the data analysis server 3A according to the second embodiment is different from the configuration of the data analysis server 3 according to the first embodiment. Configurations of the content distribution server 2 and the projector 4 in the second embodiment are the same as the configurations of the content distribution server 2 and the projector 4 in the first embodiment.

In the following explanation, the data analysis server 3A functions as the machine learning apparatus and the recommended content estimation apparatus according to the second embodiment.

Figure 14:
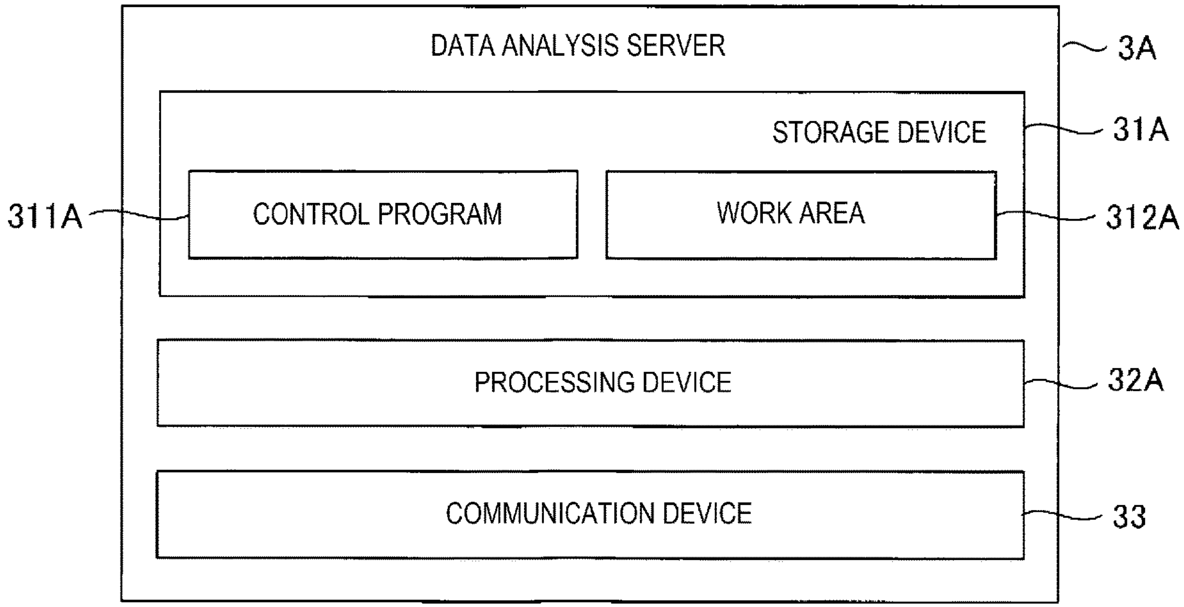
FIG. 14 is a block diagram showing a configuration example of a data analysis server shown in FIG. 13.

FIG. 14 is a block diagram showing a configuration example of the data analysis server 3A shown in FIG. 13. The data analysis server 3A includes a storage device 31A, a processing device 32A, and the communication device 33.

The storage device 31A stores various kinds of information. The storage device 31A includes, for example, a volatile memory such as a RAM and a nonvolatile memory such as a ROM. A control program 311A and the like are stored in the storage device 31A. The volatile memory of the storage device 31A is used for the processing device 32A as a work area 312A of the processing device 32A. The control program 311A is a program for controlling the entire data analysis server 3A.

Note that a part of or the entire storage device 31A may be provided in an external storage device, an external server, or the like. A part or all of the various kinds of information stored in the storage device 31A may be stored in the storage device 31A in advance or may be acquired from the external storage device, the external server, or the like.

The processing device 32A controls an operation of the data analysis server 3A. The processing device 32A includes one or more CPUs. However, the processing device 32A may include a programmable logic device such as an FPGA instead of or in addition to the CPUs.

Since a configuration of the communication device 33 is the same as the configuration of the communication device 33 according to the first embodiment, explanation of the configuration is omitted.

2.2. Machine Learning Apparatus

The machine learning apparatus according to the second embodiment is explained below with reference to FIGS. 15 to 18.

Figure 15:
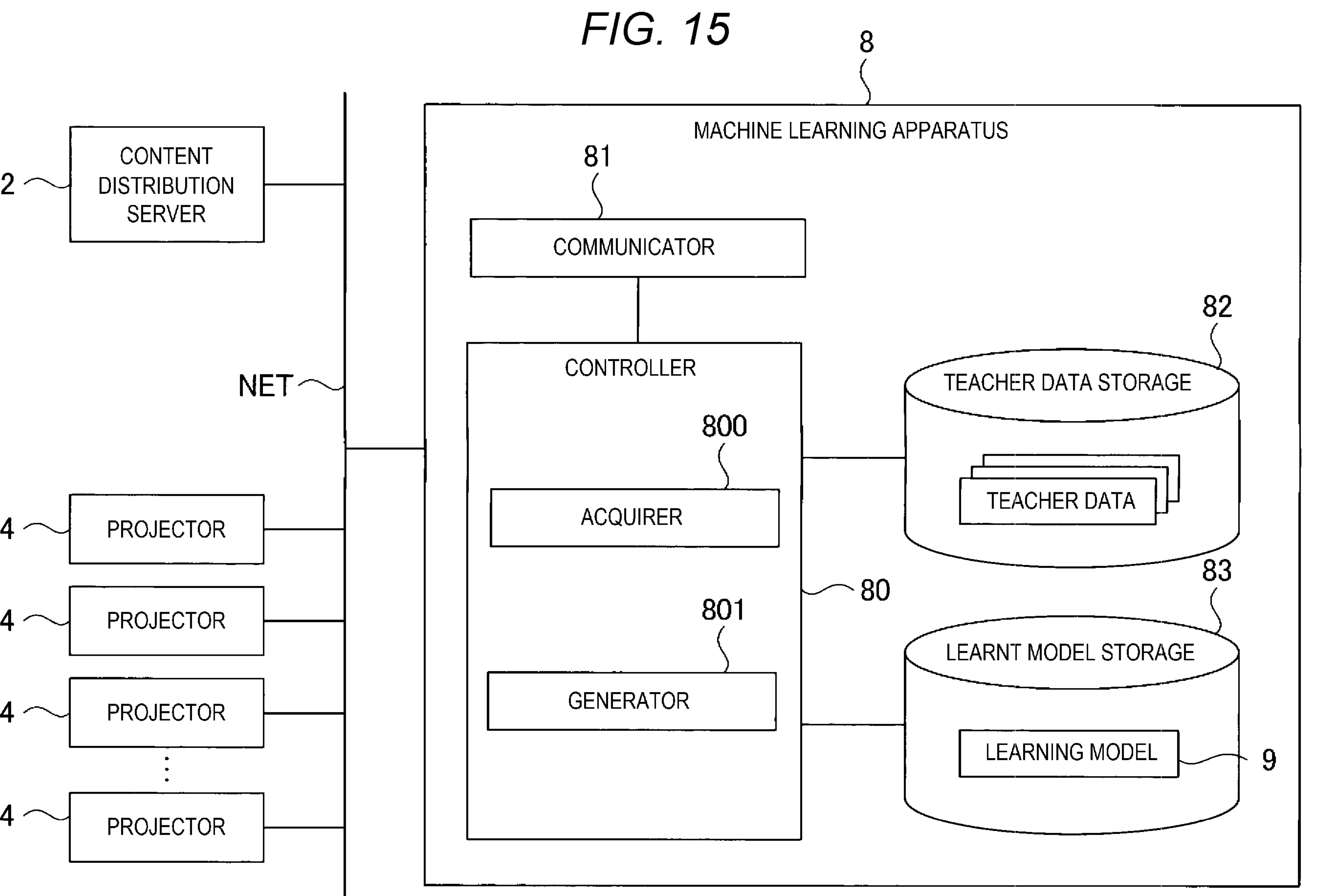
FIG. 15 is a block diagram showing an example of a machine learning apparatus according to the second embodiment.

FIG. 15 is a block diagram showing an example of a machine learning apparatus 8 according to the second embodiment. The machine learning apparatus 8 includes a controller 80, a communicator 81, a teacher data storage 82, and a learnt model storage 83. In FIG. 15, the controller 80 is implemented by the processing device 32A, the communicator 81 is implemented by the communication device 33, and the teacher data storage 82 and the learnt model storage 83 are implemented by the storage device 31A.

The controller 80 executes the control program 311A to thereby function as an acquirer 800 and a generator 801. The communicator 81 implemented by the communication device 33 is connected to the content distribution server 2 and the projectors 4 via the network NET and functions as a communication interface that transmits and receives various data.

The acquirer 800 is connected to the content distribution server 2 and the projectors 4 via the network NET and acquires a plurality of teacher data configured by input data and output data being associated.

The teacher data storage 82 is a database that stores the plurality of teacher data acquired in the acquirer 800.

The generator 801 generates a learnt learning model 9 by causing the learning model 9 to machine-learn the plurality of teacher data. More specifically, the generator 801 implements machine learning using the teacher data stored in the teacher data storage 82. That is, the generator 801 generates the learnt learning model 9 by inputting the plurality of teacher data to the learning model 9 to thereby cause the learning model 9 to machine-learn a correlation between the input data and the output data configuring the teacher data.

The learnt model storage 83 is a database that stores the learnt learning model 9 caused to perform the machine learning by the generator 801. The learning model 9 stored in the learnt model storage 83 is provided to the recommended content estimation apparatus via the network NET, a recording medium, or the like. Note that the learning model 9 may be provided to an external computer such as a server type computer or a Cloud type computer and stored in a storage of the external computer. In FIG. 15, the teacher data storage 82 and the learnt model storage 83 are shown as separate storages. However, the teacher data storage 82 and the learnt model storage 83 may be configured by a single storage.

Figure 16:
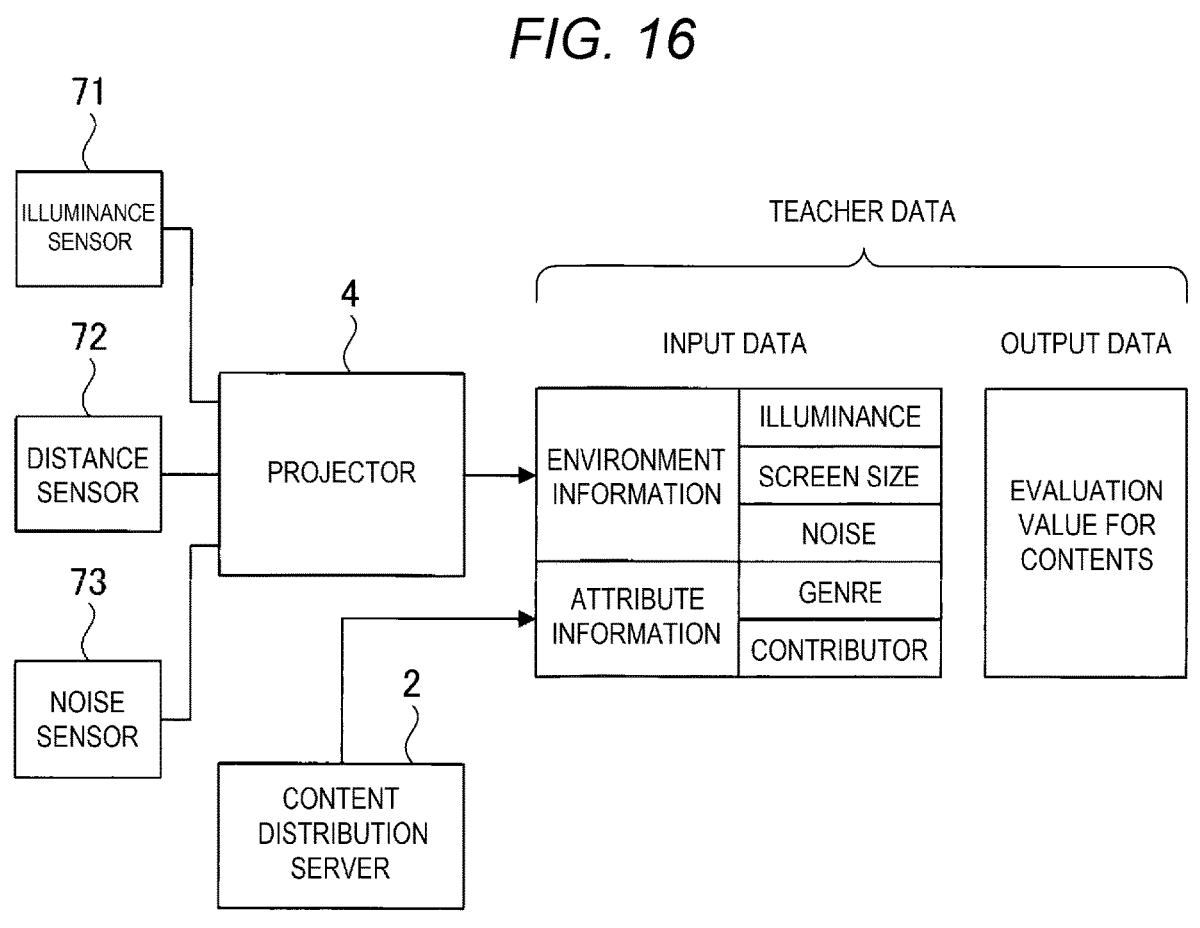

FIG. 16 is a data configuration diagram showing an example of teacher data according to the second embodiment. The teacher data is configured by a set of input data including environment information and attribute information concerning viewed content and output data including an evaluation value of a viewer for the viewed content.

The environment information includes illuminance, a screen size, and noise. The illuminance is measured by the illuminance sensor 71. The screen size is calculated based on the distance between the projector 4 and the screen 6 measured by the distance sensor 72 and a light spread angle of the projector 4. The noise is measured by the noise sensor 73. The illuminance sensor 71, the distance sensor 72, and the noise sensor 73 are connected to the projector 4.

The attribute information includes information indicating a genre of the content and a contributor of the content. The attribute information is incidental to the content in advance as metadata.

The output data is called, for example, correct answer label in the supervised learning. The evaluation value included in the output data is a value indicating a degree of viewing quality of content reproduced by the projector 4 and is given by the viewer.

In the example shown in FIG. 16, the evaluation value, that is, a viewing log is associated with, as the output data, the environment information and the attribute information included in the input data.

Figure 17:
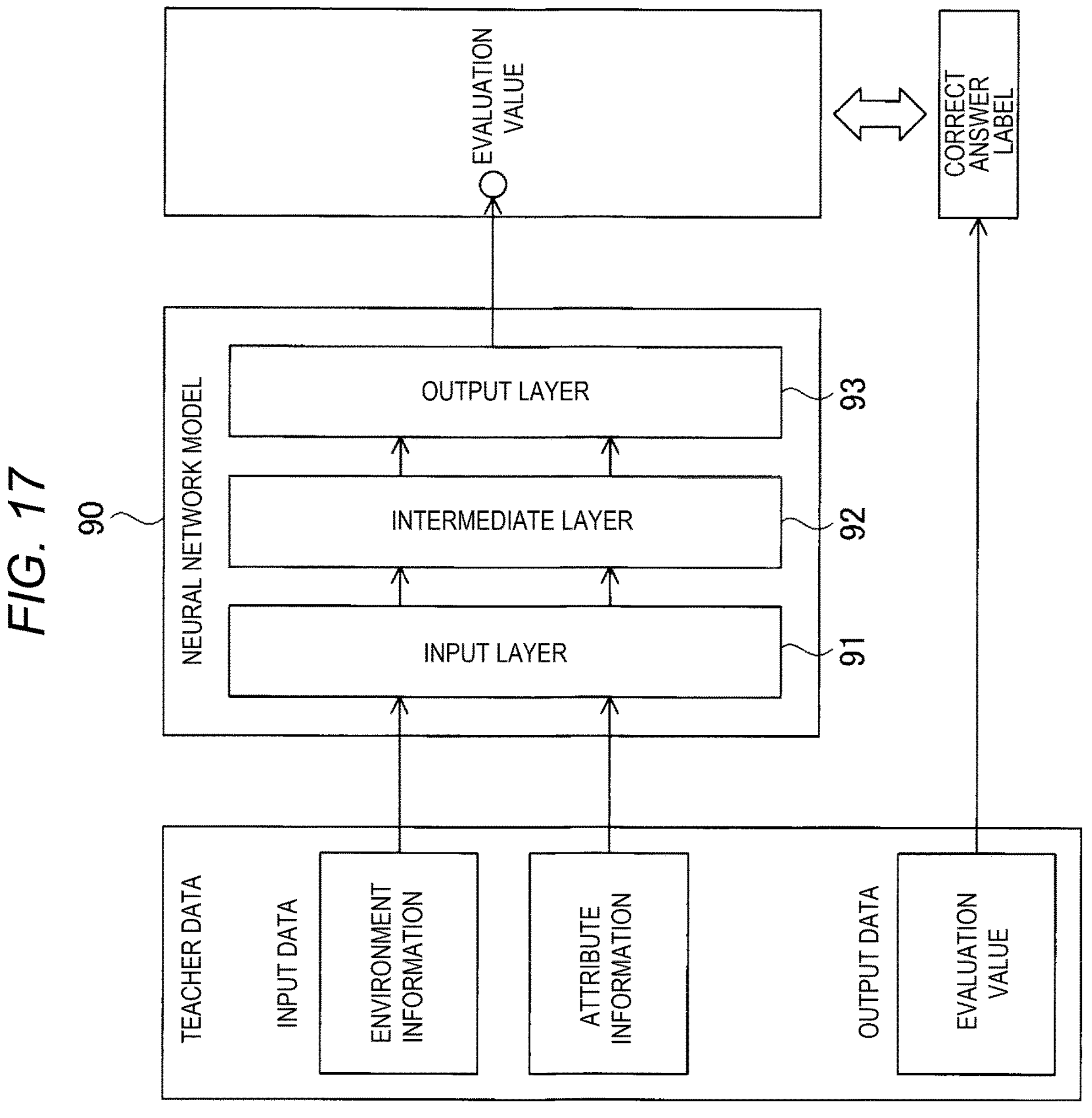
FIG. 17 is a schematic diagram showing an example of a neural network model applied to a learning model according to the second embodiment.

FIG. 17 is a schematic diagram showing an example of a neural network model applied to the learning model 9 according to the second embodiment. A neural network model 90 includes an input layer 91, an intermediate layer 92, and an output layer 93.

The input layer 91 includes neurons as many as environment information and attribute information serving as input data. The environment information and the attribute information are respectively input to the neurons.

The intermediate layer 92 is configured by, for example, a convolutional neural network. The intermediate layer 92 converts feature values extracted from the environment information and the attribute information input via the input layer 91 with an activation function and outputs the feature values as one-dimensionally arrayed feature vectors.

The output layer 93 outputs, based on the feature vectors output from the intermediate layer 92, output data including an "evaluation value" of content included in the "attribute information".

Synapses that respectively connect the neurons among the layers are stretched among phases of the neural network model 90.

The generator 801 inputs teacher data to the neural network model 90 and causes the neural network model 90 to machine-learn a correlation between the environment information and the attribute information, which are the input data, and the evaluation value, which is the output data. More specifically, the generator 801 inputs the environment information and the attribute information configuring the teacher data to the input layer 91 of the neural network model 90 as the input data.

The generator 801 repeats adjusting weights associated with the synapses using an evaluation function for comparing output data output as an inference result from the output layer 93, that is, an evaluation value and the output data configuring the teacher data, that is, a correct answer label of the evaluation value such that a value of the evaluation function decreases. Here, the adjusting the weights associated with the synapses is called back propagation.

When determining that predetermined learning end conditions are satisfied, the generator 801 ends the machine learning and stores the neural network model 90 at that point in time in the learnt model storage 83 as the learnt learning model 9. The predetermined learning end conditions are, for example, the number of times of repetition of the series of learning processing explained above reaching a predetermined number of times and a value of the evaluation function being smaller than an allowable value.

Figure 18:
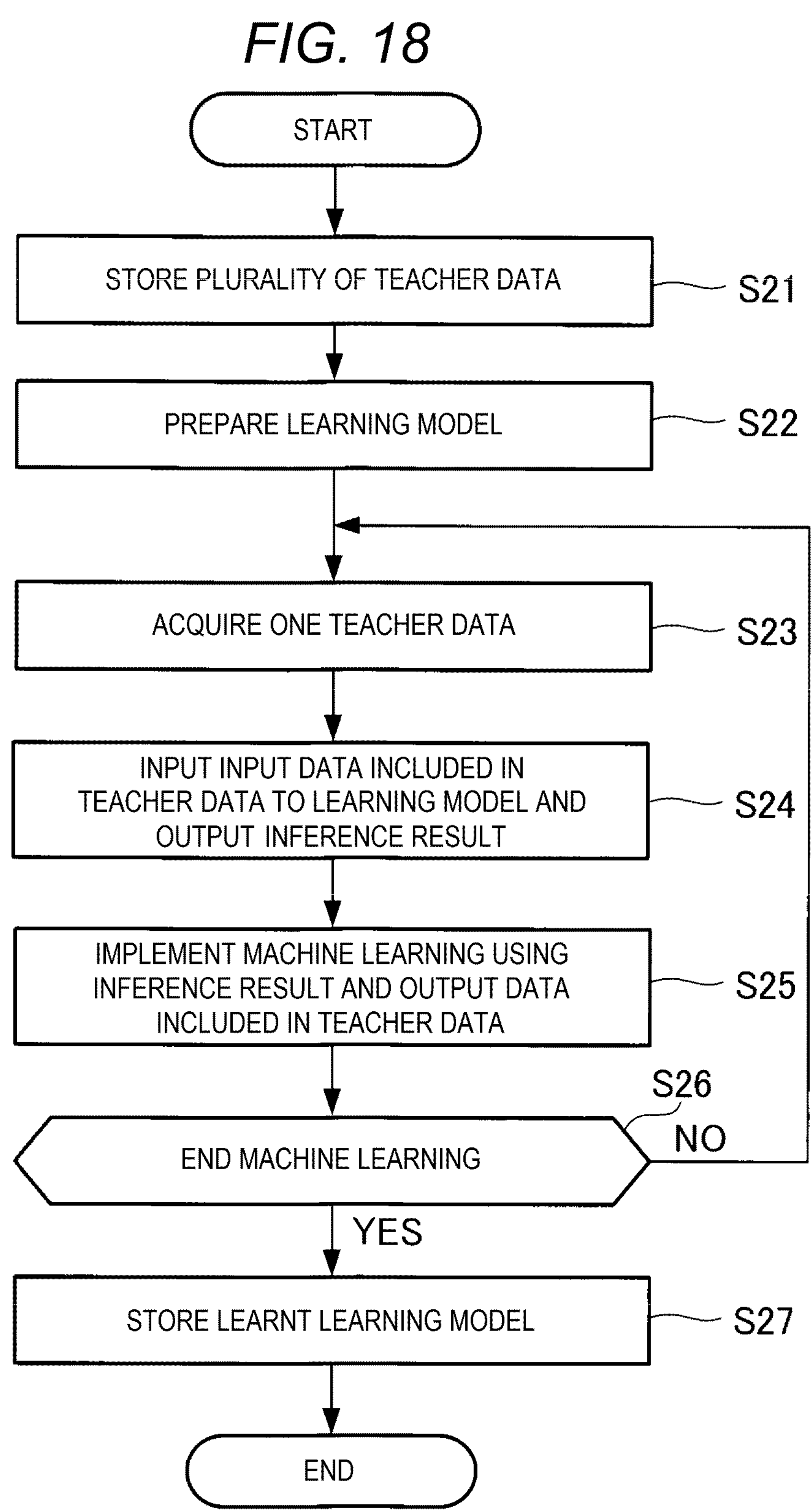
FIG. 18 is a flowchart showing an example of a machine learning method by the machine learning apparatus according to the second embodiment.

FIG. 18 is a flowchart showing an example of a machine learning method by the machine learning apparatus 8 according to the second embodiment.

First, in step S21, as prior preparation for starting machine learning, the controller 80 prepares a plurality of teacher data and stores the prepared teacher data in the teacher data storage 82. The number of teacher data to be prepared only has to be set considering inference accuracy required for the learning model 9 to be finally obtained.

Subsequently, in step S22, the controller 80 prepares a pre-learning learning model 9 in order to start the machine learning. The pre-learning learning model 9 prepared here adopts the neural network model shown in FIG. 17. The weights of the synapses are set to initial values. The attribute information and the environment information are associated with the neurons of the input layer 91 as the input data configuring the teacher data. Evaluation values of the contents serving as the output data configuring the teacher data are associated with the neurons of the output layer 93.

Subsequently, in step S23, the controller 80 acquires, for example, one teacher data at random from the plurality of teacher data stored in the teacher data storage 82.

Subsequently, in step S24, the controller 80 inputs input data included in the one teacher data to the input layer 91 of the prepared pre-learning learning model 9 or an in-learning learning model 9. As a result, output data is output from the output layer 93 of the learning model 9 as an inference result. However, the output data is generated by the pre-learning learning model 9 or the in-learning learning model 9. Therefore, in a state before learning or during learning, the output data output as the inference result indicates information different from the output data included in the teacher data, that is, the correct answer label.

Subsequently, in step S25, the controller 80 implements the machine learning by comparing output data included in the one teacher data acquired in step S23, that is a correct answer label and the output data output as the inference result from the output layer 93 in step S24 and adjusting the weights of the synapses. Consequently, the controller 80 causes the learning model 9 to learn a correlation between the input data and the output data.

Subsequently, in step S26, the controller 80 determines, based on a value of an evaluation function based on the inference result and the output data included in the teaching data, that is, the correct answer label, whether the predetermined learning end conditions have been satisfied. Note that the controller 80 may determine, based on the inference result and a remaining number of unlearnt teacher data stored in the teacher data storage 82, whether the predetermined learning end conditions have been satisfied.

When the controller 80 determines in step S26 that the learning end conditions have not been satisfied and the machine learning is continued, that is, a determination result in step S26 is negative (NO in step S26), the controller 80 implements the processing in step S23 to step S25 on the in-learning learning model 9 a plurality of times using the unlearned teacher data.

On the other hand, when the controller 80 determines in step S26 that the learning end conditions have been satisfied, that is, the determination result in step S26 is affirmative (YES in step S26), in step S27, the controller 80 adjusts the weights associated with the synapses to thereby store the learnt learning model 9 caused to perform the machine learning, that is, an adjusted weight parameter group in the learnt model storage 83 and once ends this routine.

The above is the overview of the machine learning method. Note that the controller 80 functions as the acquirer 800 in step S21 explained above and functions as the generator 801 in steps S22 to S27 explained above.

Note that, in the machine learning method shown in FIG. 18, online learning is adopted as a method of adjusting weights. However, batch learning, minibatch learning, or the like may be adopted. Further, it may be determined based on a wrong determination ratio whether the predetermined learning end conditions have been satisfied.

2.3. Recommended Content Estimation Apparatus

The recommended content estimation apparatus according to the second embodiment is explained below with reference to FIG. 19.

FIG. 19 is a block diagram showing an example of the recommended content estimation apparatus according to the second embodiment. A recommended content estimation apparatus 10 includes a controller 100, a communicator 101, and a learnt model storage 102. In FIG. 18, the controller 100 is implemented by the processing device 32A, the communicator 101 is implemented by the communication device 33, and the learnt model storage 102 is implemented by the storage device 31A.

The controller 100 executes the control program 311A to thereby function as a determination data acquirer 110, an estimator 111, a determiner 112, and an output processor 113.

The communicator 101 is connected to external devices such as the content distribution server 2 and the plurality of projectors 4 via the network NET and functions as a communication interface that transmits and receives various data.

The determination data acquirer 110 is connected to the external devices via the communicator 101 and the network NET. The determination data acquirer 110 acquires determination data including environmental indicators and candidate content. The environmental indicators are indicators indicating an environment in which the projector 4 is installed. The environmental indicators include illuminance, a screen size, and noise. The candidate content is a candidate of content to be recommended to a first viewer who uses the projector 4.

The estimator 111 inputs the determination data acquired by the determination data acquirer 110 to the learning model 9 to thereby execute inference processing for inferring an evaluation value of content. More specifically, the estimator 111 estimates that an evaluation value of content output by a viewer inputting the determination data to the learning model 9 that has learned a relation between information concerning an environment in which the viewer views the content and information concerning an attribute of the content and an evaluation value of the viewer for the content is an evaluation value of the first viewer for the candidate content.

The determiner 112 determines content recommended to the first viewer based on the evaluation value estimated by the estimator 111. For example, the determiner 112 only has to determine content having a high estimated evaluation value as recommended content.

The output processor 113 executes output processing for outputting the evaluation value of the content inferred by the determiner 112. As specific output means for outputting the evaluation value of the content, various means can be adopted. For example, the output processor 113 may transmit the evaluation value of the content to the content distribution server 2 or store the evaluation value of the content in the storage of the recommended content estimation apparatus 10.

The learnt model storage 83 is a database that stores the learnt learning model 9 used in the inference processing of the estimator 111. Note that the learnt model storage 83 may be substituted by a storage of an external computer such as a server type computer or a Cloud type computer. In that case, the estimator 111 may execute the inference processing by accessing the external computer.

2.4. Effects Achieved by the Second Embodiment

According to the above explanation, the recommended content estimation apparatus 10 according to the second embodiment includes the determination data acquirer 110, the estimator 111, and the determiner 112. The determination data acquirer 110 acquires determination data including environmental indicators indicating an environment in which the projector 4 is installed and candidate content, which is a candidate of content to be recommended to the first viewer who uses the projector 4. The estimator 111 estimates that an evaluation value output by a viewer inputting the determination data to the learning model 9 that has learned a relation between information concerning an environment in which the viewer views the content and information concerning an attribute of the content and an evaluation value by the viewer for the content is an evaluation value of the first viewer for the candidate content. The determiner 112 determines, based on the evaluation value estimated by the estimator 111, content to be recommended to the first viewer.

With the recommended content estimation apparatus explained above, the evaluation value output by inputting the determination data to the learning model 9 generated using the supervised learning is estimated as an evaluation value for the candidate content. Therefore, with the recommended content estimation apparatus, recommended content can be determined based on the estimated evaluation value. For example, content having a high estimated evaluation value can be determined as the recommended content.

The machine learning apparatus according to the second embodiment includes the acquirer 800 and the generator 801. The acquirer 800 acquires a plurality of teacher data. The generator 801 generates a learnt learning model 9 by causing the learning model 9 to machine-learn the plurality of teacher data. Each of the plurality of teacher data includes attribute information concerning an attribute of content viewed by the viewer using the projector 4 and environment information indicating an environment of the projector 4 and an evaluation value indicating a degree of viewing quality of the content, the evaluation value being given by the viewer.

With the machine learning apparatus explained above, each of the plurality of teacher data includes the attribute information and the environment information and the evaluation value. Therefore, with the machine learning apparatus, it is possible to cause the learning model 9 to learn a correlation between a viewing environment of a viewer who uses the moving image distribution platform and an evaluation value of the viewer for content. With the machine learning apparatus, it is possible to estimate that an evaluation value output by inputting determination data to a generated learnt learning model 9 is an evaluation value for candidate content.

3. Modifications

The present disclosure is not limited to the embodiments explained above. Various modifications can be adopted within the scope of the present disclosure. Specific aspects of modifications are illustrated below. Two or more aspects optionally selected from the following illustration can be combined as appropriate within a range in which the aspects do not contradict one another. Note that, in the modifications illustrated below, elements having action and functions equivalent to those in the embodiments explained above are denoted by the reference numerals and signs used in the above explanation and detailed explanation of the elements is omitted as appropriate.

3.1. Modification 1

In the first embodiment, in a strict sense, the environmental indicators corresponding to the projectors change every time content is reproduced. For example, in a certain projector, when the difference between an environmental indicator at a point in time when first content is reproduced and an environmental indicator at a point in time when second content is reproduced is smaller a determination threshold, the acquirer 321 regards that viewing environments at the two points in time are equivalent. In this case, the acquirer 321 averages the two environmental indicators.

In a certain projector, when the difference between an environmental indicator at a point in time when first content is reproduced and an environmental indicator at a point in time when second content is reproduced is equal to or larger than the determination threshold, the acquirer 321 regards that viewing environments at the two points in time are different. In this case, the acquirer 321 regards that projectors different from each other respectively installed in the different two viewing environments are present.

In this case, for example, the acquirer 321 allocates different IDs respectively to the projector at the point in time when the first content is reproduced and the projector at the point in time when the second content is reproduced. For example, even if one projector is installed in a living room, a movie is viewed in a state in which a curtain is closed to darken a room in some cases and a program for kids is viewed in a state in which the curtain is opened to brighten the room in other cases. In such a case, the acquirer 321 only has to allocate IDs different from each other to the projector in the state in which the curtain is closed and the state in which the curtain is opened and transmit data to the classifier 322.

3.2. Modification 2

In the first embodiment, the data analysis server 3 includes the recommender 323. However, the content distribution server 2 may include a part of the functions of the recommender 323. For example, the data analysis server 3 implements up to calculating an evaluation value in entire one group. The content distribution server 2 may acquire the calculated evaluation value of the entire one group from the data analysis server 3 and recommend, based on the acquired evaluation value, contents corresponding to viewing environments to viewers who use the projectors 4 belonging to the one group.

3.3. Modification 3

In the first embodiment, the classifier 322 may give, as an initial value, the number of groups to be classified. According to this modification, it is possible to reduce a time in which clustering converges.

3.4. Modification 4

A contrast ratio, which is a ratio of the luminance of a bright part and the luminance of a dark part of the projector 4 is easily affected by illuminance. Therefore, the contrast ratio may be measured and the illuminance may be estimated from the measured contrast ratio. The measured contrast ratio may be added as one of environmental indicators.

3.5. Modification 5

A screen size may be measured by projecting a projection image including a pattern for size measurement from the projector 4 to the screen 6, imaging the pattern for size measurement with a camera connected to the projector 4, and implementing image processing on the imaged pattern for size measurement. In this case, the camera is fixed such that the distance between the camera and the screen 6 and the distance between the lens of the projector 4 and the screen 6 are equal to each other. The pattern for size measurement on the screen 6 may be imaged using, instead of the fixed camera, a smartphone linked with the projector 4.

3.6. Modification 6

In the first embodiment and the second modification, the noise of the viewing environment is acquired by the noise sensor. However, the noise of the viewing environment may be calculated from a sound signal acquired using a microphone connected to the projector 4 or a smartphone linked with the projector 4.

3.7. Modification 7

In the unsupervised learning in the first embodiment, when the clustering method is used, the similarity degree is calculated from the Euclidian distance between the two tip positions different from each other. However, a Mahalanobis distance, a Manhattan distance, a Chebyshev distance, or the like may be used instead of the Euclidian distance.

3.8. Modification 8

In the first embodiment and the second embodiment, the projector 4 is used as the viewing terminal. However, a liquid crystal display, an organic EL display, a plasma display, or the like may be used as the viewing terminal. The projector 4, the liquid crystal display, the organic EL display, and the plasma display may be mixed as the viewing terminal. EL is an abbreviation of electro-luminescence.

4. Notes

A summary of the present disclosure is described below as notes.

4.1. Note 1

A content recommendation method including: acquiring, for each of a plurality of viewing terminals, an environmental indicator indicating an environment in which a viewer views content; acquiring, for each of the plurality of viewing terminals, an evaluation value indicating a degree of viewing quality of the content, the evaluation value being given by the viewer; classifying the plurality of viewing terminals into a plurality of groups according to a similarity degree of two environmental indicators different from each other among a plurality of the acquired environmental indicators; and calculating an evaluation value in entire one group of the classified groups from a plurality of the evaluation values associated with the viewing terminals belonging to the classified one group and recommending, based on the calculated evaluation value, contents corresponding to the environment to viewers who use the viewing terminals belonging to the one group.

With the content recommendation method described in Note 1, it is possible to learn, using unsupervised learning, a viewing environment of a viewer who uses a moving image distribution platform. With the content recommendation method, it is possible to classify, for each of viewing environments, a plurality of viewing terminals into several groups and calculate evaluation values of contents associated with the viewing terminals belonging to classified one group. Among a plurality of contents reproduced by a plurality of viewing terminals belonging to the one group, contents ranked high in calculated evaluation values are considered to be contents suitable for viewing environments of the viewing terminals belonging to the group, that is, contents that should be recommenced. Therefore, with the content recommendation method described in Note 1, it is possible to recommend content suitable for a viewing environment to the viewer.

4.2. Note 2

The content recommendation method described in Note 1, wherein the environmental indicators may include at least one of illuminance of the viewing environment, a size of a screen of the viewing terminal, and noise in the viewing environment.

The illuminance indicating the brightness of the viewing environment is an indicator greatly affecting viewing of the viewing terminal. A tendency of content viewed in a relatively bright environment and a tendency of content viewed in a relatively dark environment are considered to be different. A tendency of content viewed in a relatively large screen size and a tendency of content viewed in a relatively small screen size are considered to be different. A tendency of content viewed in a home where a noise value is relatively low and a tendency of content viewed in a commercial facility where a noise value is relatively high are considered to be different.

Therefore, with the content recommendation method described in Note 2, by learning the viewing environment of the viewer using the illuminance of the viewing environment, the size of the screen of the viewing terminal, and the noise in the viewing environment as the environmental indicators, it is possible to recommend more appropriate content to the viewer.

4.3. Note 3

The content recommendation method described in Note 2, wherein the viewing terminal may be a projector, the content may be displayed on a projection target by the projector, and the size of a screen may be a size of a screen displayed on the projection target.

The projector is a display device easily affected by illuminance. Since the luminance on a projection surface decreases as the size of the screen is increased, the projector is more easily affected by the illuminance as the size of the screen is increased. The projector is widely used in an environment in which a noise value is relatively low to an environment in which a noise value is relatively high. Therefore, with the content recommendation method described in Note 3, since projectors are classified into several groups using the illuminance, the size of the screen, and the noise as indicators, it is possible to recommend contents suitable for use environments of the projectors.

4.4. Note 4

The content recommendation method described in any one of Note 2 to Note 3, wherein at least the noise may be included in the environmental indicators.

With the content recommendation method described in Note 4, since the viewing terminals are classified into several groups using the noise as an indicator, it is possible to recommend contents suitable for use environments of the viewing terminals.

4.5. Note 5

A content distribution system that distributes one or more contents to each of a plurality of viewing terminals, the content distribution system including: a content distribution server; and a data analysis server, wherein the content distribution server distributes, out of a stored plurality of contents, viewing content corresponding to a request of a viewer, who uses each of the plurality of viewing terminals, to the viewing terminal associated with the viewer, and the data analysis server includes: an acquirer configured to acquire, for each of the plurality of viewing terminals, an environmental indicator indicating an environment in which the viewer views content and an evaluation value indicating a degree of viewing quality of the content, the evaluation value being given by the viewer; a classifier configured to classify the plurality of viewing terminals into a plurality of groups according to a similarity degree of two environmental indicators different from each other among a plurality of the acquired environmental indicators; and a recommender configured to calculate an evaluation value in entire one group of the classified groups from a plurality of the evaluation values associated with the viewing terminals belonging to the classified one group and recommend, based on the calculated evaluation value, contents corresponding to the environment to viewers who use the viewing terminals belonging to the one group.

With the content distribution system described in Note 5, it is possible to learn, using unsupervised learning, a viewing environment of a viewer who uses a moving image distribution platform. With the content distribution system, it is possible to classify, for each of viewing environments, a plurality of viewing terminals into several groups and calculate evaluation values of contents associated with the viewing terminals belonging to classified one group. Among a plurality of contents reproduced by a plurality of viewing terminals belonging to the one group, contents ranked high in calculated evaluation values are considered to be contents suitable for viewing environments of the viewing terminals belonging to the group, that is, contents that should be recommenced. Therefore, with the content distribution system, it is possible to recommend content suitable for a viewing environment to the viewer.

4.6. Note 6

A recommended content estimation apparatus including: a determination data acquirer configured to acquire determination data including an environmental indicator indicating an environment in which a viewing terminal is installed and a candidate content that is a candidate of content to be recommended to a first viewer who uses the viewing terminal; an estimator configured to estimate that an evaluation value output by inputting the determination data to a learning model that learned a relation between information concerning an environment at a time when a viewer views content and information concerning an attribute of the content and an evaluation value by the viewer for the content is an evaluation value of the first viewer for the candidate content; and a determiner configured to determine, based on the evaluation value estimated by the estimator, the content to be recommended to the first viewer.

With the recommended content estimation apparatus described in Note 6, an evaluation value output by inputting the determination data to a learning model generated using supervised learning is estimated as an evaluation value for the candidate content. Therefore, with the recommended content estimation apparatus, it is possible to determine recommended content based on the estimated evaluation value. With the recommended content estimation apparatus, for example, it is possible to determine, as the recommended content, content having a high estimated evaluation value.

4.7. Note 7

A machine learning apparatus including: an acquirer configured to acquire a plurality of teacher data; and a generator configured to generate a learnt learning model by causing a learning model to machine-learn the plurality of teacher data, wherein each of the plurality of teacher data includes attribute information concerning an attribute of content viewed by a viewer using a viewing terminal and environment information indicating an environment of the viewing terminal and an evaluation value indicating a degree of viewing quality of the content, the evaluation value being given by the viewer.

With the machine learning apparatus described in Note 7, each of the plurality of teacher data includes the attribute information and the environment information and the evaluation value. Therefore, with the machine learning apparatus, it is possible to cause the learning model to learn a correlation between a viewing environment of a viewer who uses a moving image distribution platform and an evaluation value of the viewer for content. With the machine learning apparatus, it is possible to estimate, as an evaluation value for candidate content, an evaluation value output by inputting determination data to the generated learnt learning model.

What is claimed is:

1. A content recommendation method comprising:

acquiring, for each of a plurality of viewing terminals, (i) a first environmental indicator indicating an illuminance in an environment in which a viewer views content, (ii) a second environmental indicator indicating a screen size of a screen onto which the content is projected, the second environmental indicator being determined based on a distance measured by a sensor between respective viewing terminal and the screen, and (iii) a third environmental indicator indicating a noise level in the environment in which the viewer views the content;

acquiring, for each of the plurality of viewing terminals, an evaluation value indicating a degree of viewing quality of the content, the evaluation value being given by the viewer;

classifying the plurality of viewing terminals into a plurality of groups according to a similarity degree of the first, second, and third environmental indicators by:

generating a virtual three-dimensional vector space, placing the first, second and third environmental indicators as feature vectors that are orthogonal to each other in the virtual three-dimensional vector space, and classifying certain viewing terminals into a same group based on a similarity of tip positions of their respective feature vectors in the virtual three-dimensional vector space; and calculating an evaluation value in entire one group of the classified groups from a plurality of the evaluation values associated with the viewing terminals belonging to the classified one group, determining, based on the calculated evaluation value, recommended contents corresponding to the environment to viewers who use the viewing terminals belonging to the one group, and causing the respective viewing terminal to display the recommended contents corresponding to the environment on the respective screen.

2. The content recommendation method according to claim 1, wherein each of the plurality of viewing terminals is a projector, and the content is displayed on the respective screen by the projector.

3. A content distribution system that distributes one or more contents to each of a plurality of viewing terminals, the content distribution system comprising:

a content distribution server; and a data analysis server, wherein the content distribution server distributes, out of a stored plurality of contents, viewing content corresponding to a request of a viewer, who uses each of the plurality of viewing terminals, to the viewing terminal associated with the viewer, and the data analysis server includes:

an acquirer configured to acquire, for each of the plurality of viewing terminals, (i) a first environmental indicator indicating an illuminance in an environment in which the viewer views content, (ii) a second environmental indicator indicating a screen size of a screen onto which the content is projected, the second environmental indicator being determined based on a distance measured by a sensor between respective viewing terminal and the screen, (iii) a third environmental indicator indicating a noise level in the environment in which the viewer views the content, and (iv) an evaluation value indicating a degree of viewing quality of the content, the evaluation value being given by the viewer;

a classifier configured to classify the plurality of viewing terminals into a plurality of groups according to a similarity degree of the first, second, and third environmental indicators by:

generating a virtual three-dimensional vector space, placing the first, second and third environmental indicators as feature vectors that are orthogonal to each other in the virtual three-dimensional vector space, and classifying certain viewing terminals into a same group based on a similarity of tip positions of their respective feature vectors in the virtual three-dimensional vector space; and a recommender configured to calculate an evaluation value in entire one group of the classified groups from a plurality of the evaluation values associated with the viewing terminals belonging to the classified one group, determine, based on the calculated evaluation value, recommended contents corresponding to the environment to viewers who use the viewing terminals belonging to the one group, and cause the respective viewing terminal to display the recommended contents corresponding to the environment on the respective screen.

4. A recommended content estimation apparatus comprising:

a processor programmed to:

acquire determination data including at least (i) a first environmental indicator indicating an illuminance in an environment in which a viewing terminal is installed, (ii) a second environmental indicator indicating a screen size of a screen onto which the content is projected, the second environmental indicator being determined based on a distance measured by a sensor between the viewing terminal and the screen, (iii) a third environmental indicator indicating a noise level in the environment in which a first viewer views the content, and (iv) candidate content that is a candidate of recommended content to the first viewer who uses the viewing terminal;

estimate an evaluation value of the first viewer for the candidate content by inputting the determination data to a learning model that learned a relation between information concerning an environment at a time when a viewer views content and information concerning an attribute of the content and an evaluation value by the viewer for the content, wherein the relation is separately learned for a plurality of groups of viewing terminals by:

generating a virtual three-dimensional vector space, placing the first, second and third environmental indicators as feature vectors that are orthogonal to each other in the virtual three-dimensional vector space, and classifying certain viewing terminals into a same group based on a similarity of tip positions of their respective feature vectors in the virtual three-dimensional vector space;

determine, based on the estimated evaluation value of the first viewer for the candidate content, the recommended content to the first viewer, and cause the viewing terminal to display the recommended content corresponding to the environment on the screen.

* * * * *